(12) United States Patent
Kelpie et al.

(10) Patent No.: US 12,412,485 B2
(45) Date of Patent: *Sep. 9, 2025

(54) APPARATUS AND METHOD FOR EDUCATION AND LEARNING

(71) Applicant: STAR 3 GROUP, LTD., Londonderry (GB)

(72) Inventors: Patricia Kelpie, Londonderry (GB); Maria Munoz-Condis, Dumont, NJ (US)

(73) Assignee: STAR 3 GROUP, LTD., Londonderry (GB)

( * ) Notice: Subject to any disclaimer, the term of this patent is extended or adjusted under 35 U.S.C. 154(b) by 78 days.

This patent is subject to a terminal disclaimer.

(21) Appl. No.: 18/124,331

(22) Filed: Mar. 21, 2023

(65) Prior Publication Data

US 2023/0230495 A1    Jul. 20, 2023

Related U.S. Application Data

(63) Continuation of application No. 16/182,281, filed on Nov. 6, 2018, now Pat. No. 11,626,029.

(60) Provisional application No. 62/582,883, filed on Nov. 7, 2017, provisional application No. 62/583,220, filed on Nov. 8, 2017.

(51) Int. Cl.
| | |
|---|---|
| *G09B 19/00* | (2006.01) |
| *A41D 19/00* | (2006.01) |
| *A61H 1/02* | (2006.01) |
| *G09B 19/24* | (2006.01) |
| *G09B 11/02* | (2006.01) |
| *G09B 21/00* | (2006.01) |

(52) U.S. Cl.
CPC ......... *G09B 19/00* (2013.01); *A41D 19/0013* (2013.01); *A41D 19/0034* (2013.01); *A61H 1/0285* (2013.01); *G09B 19/003* (2013.01); *G09B 19/24* (2013.01); *A61H 2201/1253* (2013.01); *A61H 2201/1635* (2013.01); *A61H 2201/165* (2013.01); *G09B 11/02* (2013.01); *G09B 19/0076* (2013.01); *G09B 21/001* (2013.01); *G09B 21/009* (2013.01)

(58) Field of Classification Search
None
See application file for complete search history.

(56) References Cited

U.S. PATENT DOCUMENTS

| | | |
|---|---|---|
| 4,587,673 A | 5/1986 | Boliard |
| 5,682,610 A | 11/1997 | Wamer |

(Continued)

FOREIGN PATENT DOCUMENTS

| | | |
|---|---|---|
| CN | 2503732 Y | 8/2002 |
| CN | 103549678 A | 2/2014 |

OTHER PUBLICATIONS

European Application No. EP18275172.7, Extended European Search Report mailed Jan. 18, 2019, 8 pages.

*Primary Examiner* — James B Hull
(74) *Attorney, Agent, or Firm* — Hard IP LLC

(57) ABSTRACT

Embodiments in accordance with the present disclosure provide an apparatus that facilitates education and learning through tactile sensory demonstration and action. The apparatus includes a first part and a second part attached to the first part. The first part may be worn by a guide, while the second part may be worn by a child or a student undergoing training. The apparatus allows the guide to control the movements of the child or the student.

12 Claims, 25 Drawing Sheets

(56) References Cited

U.S. PATENT DOCUMENTS

| | | |
|---|---|---|
| 6,006,358 A | 12/1999 | Keating |
| 6,447,464 B1 | 9/2002 | Dunlevy et al. |
| 6,526,591 B2 | 3/2003 | Leumi |
| 8,075,427 B2 | 12/2011 | Millsap |
| 8,591,235 B1 | 11/2013 | Berman |
| 2013/0227760 A1 | 9/2013 | Mahon |
| 2014/0215685 A1 | 8/2014 | Bush et al. |
| 2015/0089713 A1 | 4/2015 | Gonzalez |

900

APPARATUS AND METHOD FOR EDUCATION AND LEARNING

CROSS-REFERENCE TO RELATED APPLICATIONS

This application is a continuation application and claims priority to U.S. patent application Ser. No. 16/182,281 filed on Nov. 6, 2018, which claims the benefit of both U.S. Provisional Application Ser. Nos. 62/582,883 filed on Nov. 7, 2017, and 62/583,220 filed on Nov. 8, 2017, the entire contents of which are hereby incorporated by reference in their entirety.

FIELD OF THE INVENTION

Embodiments in accordance with the present disclosure relate to an apparatus and a method that facilitates education and learning. In particular, embodiments in accordance with the present disclosure relate to a hand-over-hand apparatus and a method for facilitating education and learning of a physical task through tactile sensory demonstration and action.

BACKGROUND

Autism is one of the most common and prevalent neurodevelopmental disorders. Autism typically occurs on a spectrum of severity and is characterized by deficits in communication and social skills, and the presence of rigid, repetitive behaviors. People having autism may require lifelong care.

A parent or a caregiver of a child with autism may also suffer from fatigue and stress due to an increased amount of childcare and continued dependency of the child in performing basic tasks.

At present, there is no known cure for autism and the exact cause is still being investigated. Further, many children and adults on the autism spectrum and/or other developmental disabilities do not have the attention, social skills, and/or learning capabilities to adhere to traditional styles of teaching.

Related arts include various tools or devices to facilitate teaching of basic tasks to students/children with developmental disabilities. For example, a related art provides training scissors that feature a V-shaped design of the finger holes making it easy and comfortable for a teacher's hand to guide the students.

Related art further provides a spandex glove that provides just enough proprioceptive input and compression to facilitate handwriting. Other conventional training devices include shoe lace training kits, dressing frames, pencil grips, and so forth.

However, such devices or tools may have a complicated design and are limited to a particular task. Moreover, such devices or tools may not provide adequate control to a teacher or guide.

Moreover, children with Autism Spectrum Disorder (ASD) may have a sensitivity to certain materials and labels. Specifically, clothes with washing labels, itchy materials and seams may cause sensory discomfort to children with ASD.

SUMMARY

Embodiments of the present disclosure generally relate to a hand-over-hand apparatus or device that facilitates education and learning through tactile sensory demonstration and action. The apparatus provides enhanced teaching experience while teaching basic skills, such as self-care tasks, handwriting, scissor skills, hand motor coordination and so forth, to a disabled or an autistic child. The apparatus also may be helpful to teach skills to persons with certain disabilities such as blindness or deafness, and to persons rehabilitating from physical injuries or diseases that affect motor skills.

Embodiments in accordance with the present disclosure provide an apparatus including two gloves attached to one another such that the apparatus can accommodate two person's hands in a hand-over-hand configuration. The gloves may be made of a fabric-like material. The material may include certain textures, durability and varying properties, such as waterproof or water resistant and easy cleanability. The glove material is not necessarily selected on the basis of its heat insulation properties.

Embodiments in accordance with the present disclosure further provide an apparatus that facilitates education and learning through tactile sensory demonstration and action. The apparatus may be made from a material which is attuned to the sensory needs of children with autism spectrum disorder. Further, the material may include 100 percent soft cotton, with no labels. The apparatus may also comply with all the safety specifications of autism.

Embodiments in accordance with the present disclosure further provide an apparatus that facilitates education and learning through tactile sensory demonstration and action. The apparatus may be available in different colors to make the use of the apparatus fun for children. Further, the apparatus may be available in different sizes (i.e., small, medium and large) to accommodate different sizes of hands. Moreover, the apparatus may provide different range of motion for effective training.

Embodiments in accordance with the present disclosure further provide an apparatus that facilitates education and learning through tactile sensory demonstration and action. The apparatus may serve as a memory building tool which is interactive, easy to use, handy, portable, affordable and lightweight.

Embodiments in accordance with the present disclosure further provide an apparatus that facilitates education and learning through tactile sensory demonstration and action. The apparatus includes a first part and a second part attached to the first part. The first part may be a first fingerless glove, while the second part may be a second fingerless glove. Further, the first glove may be attached on a top side of the second glove via any attachment methods, such as but not limited to, sewing, heat sealing, Velcro® hook and loop fasteners, and so forth. The apparatus may provide greater flexibility and movement due to minimum attachment between the first glove and the second glove.

Embodiments in accordance with the present disclosure are directed to an apparatus that facilitates education and learning through tactile sensory demonstration and action. The apparatus includes a glove configured for receiving two hands. The glove may be a short fingerless glove. The glove may include a top portion and a bottom portion sufficiently spaced apart from the top portion, to allow receiving of two hands simultaneously.

Embodiments in accordance with the present disclosure are further directed to a handover-hand apparatus including a glove. The glove including five cavities, one for each of the four fingers and a thumb. The glove also includes a material banding or band under each of the five cavities. The material of the band or banding may be an elastic material and/or a fabric material. The glove is configured to receive a hand of a person, while the material bandings are configured to receive fingers of another person.

Embodiments in accordance with the present disclosure are further directed to a handover-hand apparatus. The hand-over-hand apparatus includes a first glove and a second glove. The first glove may be attached to the second glove from all the sides and around each finger of the second glove.

Yet other embodiments of the present disclosure are directed to a hand-over-hand apparatus. The hand-over-hand apparatus includes a first glove and a second glove. The first glove may be attached to the second glove at finger tips to allow maximum movement and flexibility. Further, the first glove may be attached to the second glove by any suitable attachment methods, such as sewing, heat seal, Velcro® and so forth.

Other embodiments of the present disclosure are directed to a hand-over-hand apparatus. The hand-over-hand apparatus includes a first glove and a second glove. The first glove may be attached to the second glove at the sides and at the corresponding finger elements to allow greater control and maximum pressure. Therefore, the apparatus may be used for training with sharp objects, for example, a pair of scissors.

Embodiments of the present disclosure also provide a method of training or teaching various tasks to a child or a student suffering from a developmental disability, such as autism. The method uses a hand-over-hand apparatus or tool that facilitates training or teaching through tactile sensory demonstration and action.

Embodiments of the present disclosure further provide a hand-over-hand apparatus or device that has a low production cost per unit, has a low weight, has easy and low-cost packaging and shipping, and has an affordable purchase price so that it is accessible to parents of learning disabled or autistic children.

Embodiments of the present disclosure also provide a hand-over-hand apparatus or tool that provides an enhanced experience and can shorten a duration required for teaching various skills to children with developmental disabilities and learning challenges. Such skills include self-care tasks, handwriting (pencil grip, letter formation etc.), scissors skills, hand motor coordination, and so forth. Detailed instructions may be provided with the hand-over-hand apparatus to help a teacher or a guide.

These and other advantages will be apparent from the present application of the embodiments described herein.

The preceding is a simplified summary to provide an understanding of some embodiments of the present disclosure. This summary is neither an extensive nor exhaustive overview of the present disclosure and its various embodiments. The summary presents selected concepts of the embodiments of the present disclosure in a simplified form as an introduction to the more detailed description presented below. As will be appreciated, other embodiments of the present disclosure are possible utilizing, alone or in combination, one or more of the features set forth above or described in detail below.

BRIEF DESCRIPTION OF THE DRAWINGS

The accompanying drawings, which are incorporated in and constitute a part of this specification, illustrate several embodiments of the disclosure and, together with the description, explain the principles of the disclosure.

Figure 1A:
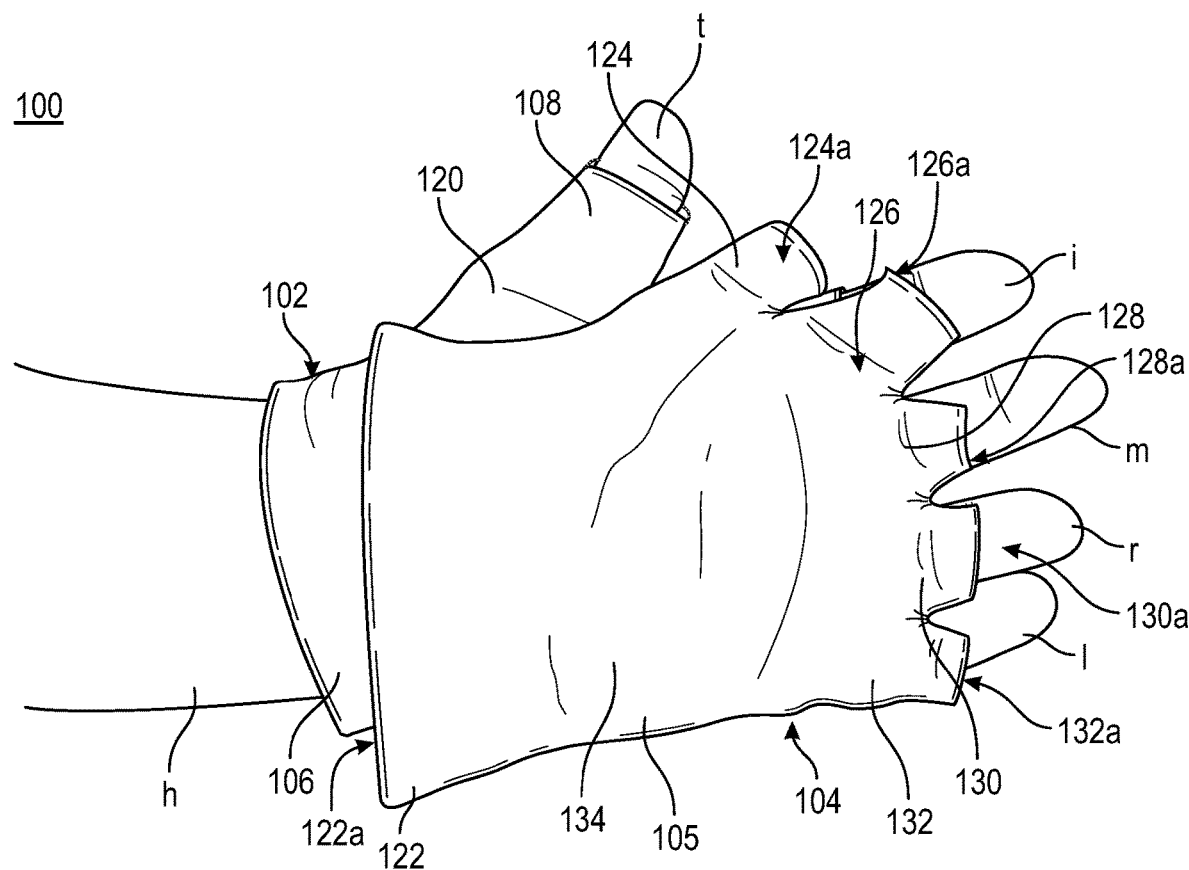
FIG. 1A illustrates a bottom perspective view of a hand-over-hand apparatus with an adult hand inserted therein, in accordance with an embodiment of the present disclosure.

While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The present disclosure is related to a hand-over-hand apparatus or device, and a method of using the hand-over-hand apparatus. The hand-over-hand apparatus includes a first part and a second part attached to the first part. The first part may include any one of a short fingerless glove, a long fingerless glove, a full glove or elastic bandings/bands. The first part may be configured to receive a hand of a first person. The second part may include any one of a short fingerless glove, a long fingerless glove, a full glove or material bands. The material of the material bands maybe, for example, an elastic material and/or a fabric material. Material bands for the first part are usable with a glove for the second part, and material bands for the second part are usable with a glove for the first part. The second part may be configured to receive a hand of a second person. A fingerless glove of the present disclosure may relate to a glove that allows fingers to extend out of corresponding finger elements or projections, i.e., the fingers are not completely enclosed by the glove. In some embodiments, the first part and the second part may be attached to each other via any attachment methods, such as but not limited to, sewing, hot seal, Velcro® hook and loop fasteners, and so forth. In some other embodiments, the first part and the second part may be integrally formed and may together define a cavity to receive hands of two persons. In an exemplary embodiment, the first part is configured to receive a hand of an adult or a guide, while the second part is configured to receive a hand of a child or a student.

Figure 1B:
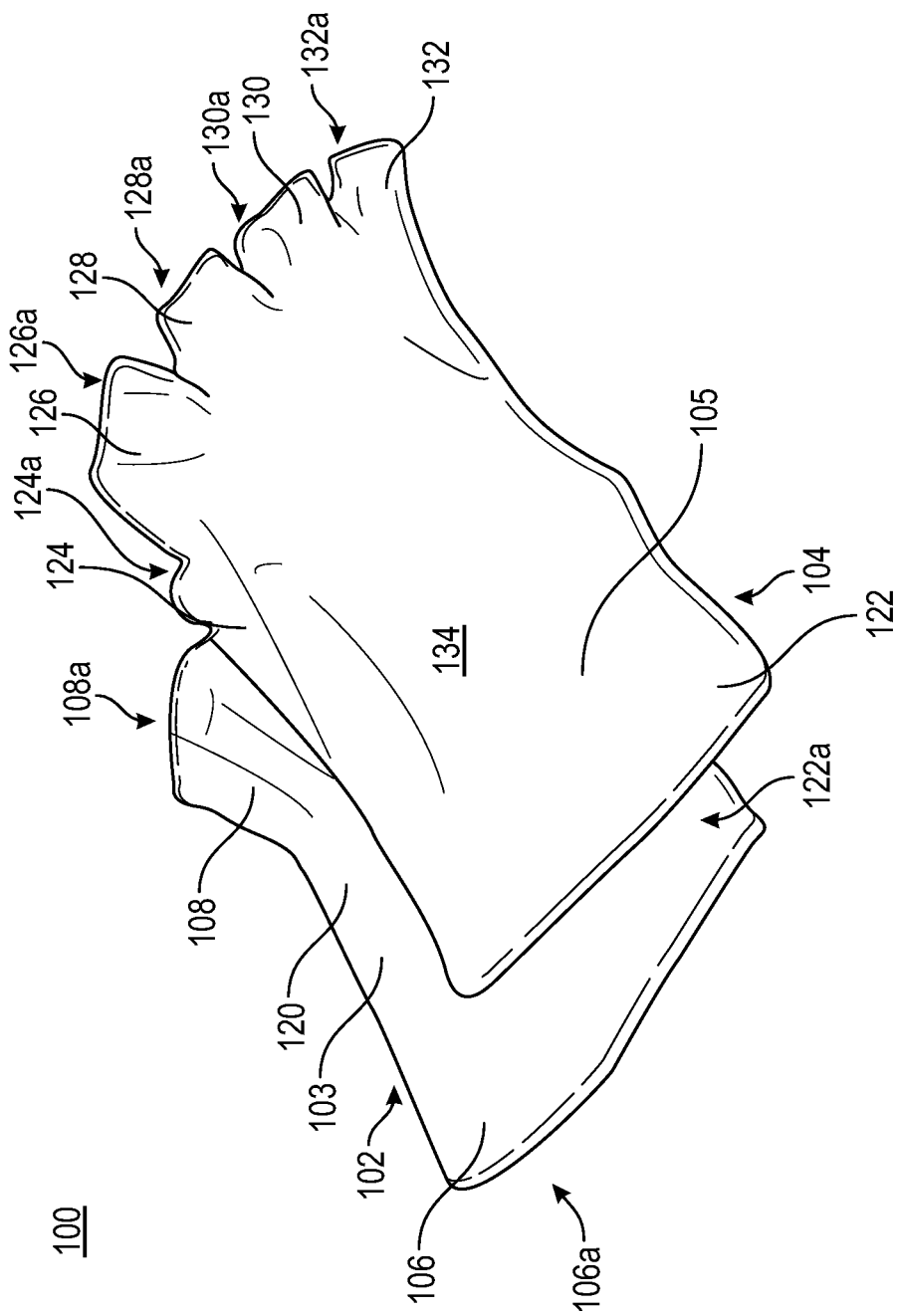
FIG. 1B illustrates a bottom perspective view of the hand-over-hand apparatus of FIG. 1A.
Figure 1C:
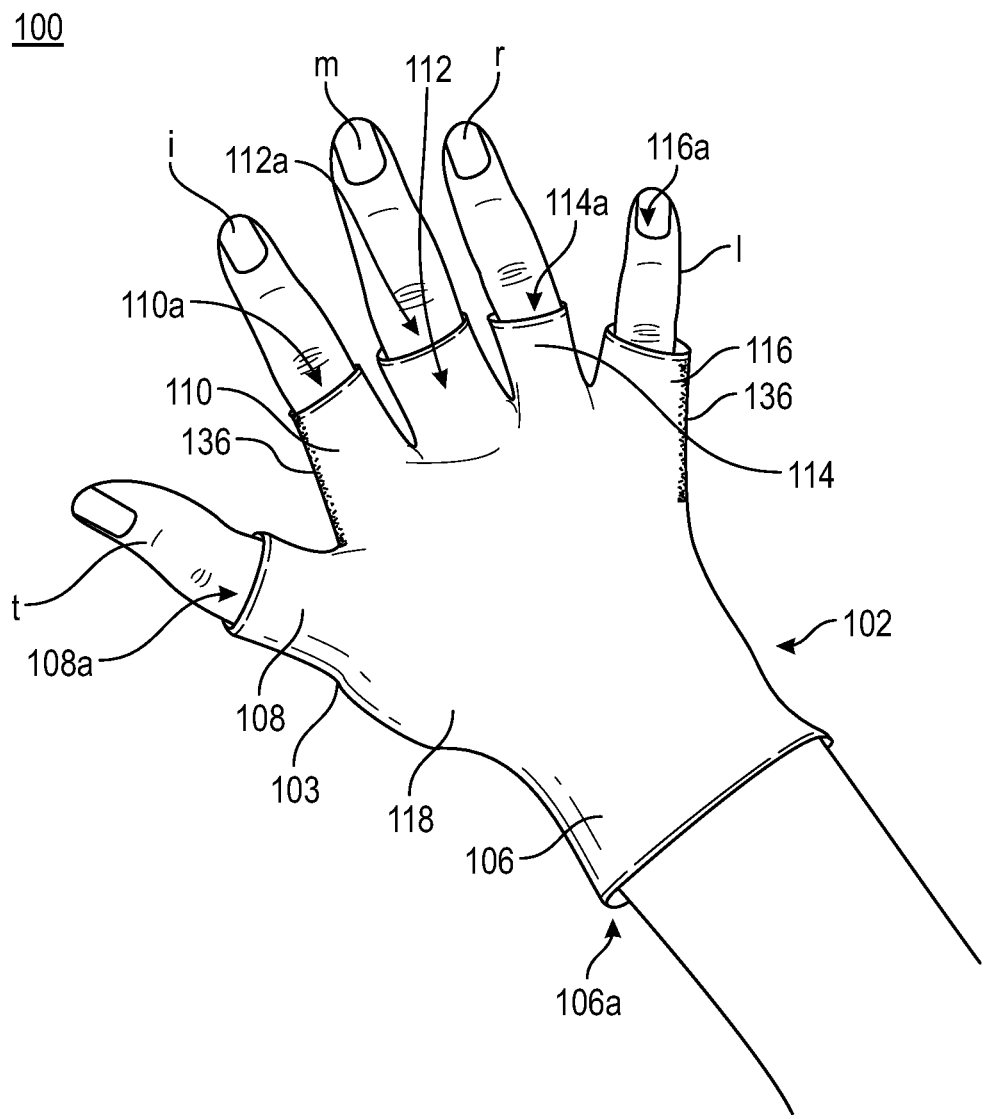
FIG. 1C illustrates a top view of the hand-over-hand apparatus of FIG. 1A in use, with one of two hands visible.

FIG. 1A illustrates a bottom perspective view of a hand-over-hand apparatus or device 100 (hereinafter referred to as "the apparatus 100") in use, in accordance with an embodiment of the present disclosure. FIG. 1B illustrates a bottom perspective view of the apparatus 100. FIG. 1C illustrates a top view of the apparatus 100. Referring to FIGS. 1A-1C, the apparatus 100 includes a first part 102 and a second part 104. Each of the first part 102 and the second part 104 may define an internal volume configured to at least partially receive therein a hand, a wrist and/or one or more fingers of a user. In an exemplary embodiment, the first part 102 may be a fingerless glove having a body 103. The body 103 includes a wrist portion 106 including a wrist opening 106a. The wrist opening 106a allows a hand "h" of a first user to be inserted into the first part 102. The wrist portion 106 may partially cover the wrist of the user during use. The body 103 may enclose the hand "h" of the first user.

The body 103 also includes five finger elements 108, 110, 112, 114 and 116. In some embodiments, the first finger element 108 may receive a thumb "t" (Latin pollex) of the first user. The first finger element 108 further defines a first end opening 108a, which allows the thumb "t" to extend therethrough. In an embodiment, the first finger element 108 may at least partly cover the thumb "t". In some embodiments, the second finger element 110 may receive an index finger "i" (Latin digitus secundus manus) of the first user. The second finger element 110 further defines a second end opening 110a, which allows the index finger "i" to extend therethrough. In an embodiment, the second finger element 110 may at least partly cover the index finger "i". In some embodiments, the third finger element 112 may receive a middle finger "m" (Latin digitus medius manus) of the first user. The third finger element 112 further defines a third end opening 112a, which allows the middle finger "m" to extend therethrough. In an embodiment, the third finger element 112 may at least partly cover the middle finger "m". In some embodiments, the fourth finger element 114 may receive a ring finger "r" (Latin digitus annularis manus) of the first user. The fourth finger element 114 further defines a fourth end opening 114a, which allows the ring finger "r" to extend therethrough. In an embodiment, the fourth finger element 114 may at least partly cover the ring finger "r". In some embodiments, the fifth finger element 116 may receive a little finger or pinky "l" (Latin digitus minimus manus) of the first user. The fifth finger element 116 further defines a fifth end opening 116a, which allows the little finger "l" to extend therethrough. In an embodiment, the fifth finger element 116 may at least partly cover the little finger "l".

In some embodiments, the first part 102 may also define a dorsal or top section 118 and a palm or bottom section 120. The dorsal section 118 may cover a dorsal part of the hand "h", while the palm section 120 may cover a palm of the hand "h". In an embodiment, the dorsal section 118 and the palm section 120 may be separately manufactured and then connected to each other by various methods, such as sewing, hot seal, adhesives, and so forth. In an alternative embodiment, the dorsal section 118 and the palm section 120 may be integrally manufactured.

In an embodiment, the first part 102 may be made from a fabric-like material. In various embodiments, the material of the first part 102 may include a natural or synthetic fabric, wool, leather, rubber, latex, neoprene, and so forth. In another embodiment, the first part 102 may be made from a material having certain textures, durability and varying properties, such as waterproof or water resistant and easy to clean property. In yet another embodiment, the first part 102 may be made from a material which is flexible or elastic enough to allow the first part 102 to adapt to hands of different sizes. In an embodiment, the first part 102 may be designed in various sizes (i.e., small, medium, and large). In an exemplary embodiment, the first part 102 may be designed with an average size of an adult's hand. Alternatively, the first part 102 may be designed with an average size of a child's hand. In an exemplary embodiment, the first part 102 may be have a weight of 5-10 grams. Further, the first part 102 may comply with safety specifications of autism. In some embodiments, the material of the first part 102 may be able to withstand temperatures between −40° C. and +40° C. In an embodiment, the material of the first part 102 may include 100 percent soft cotton, with no labels. The material may be attuned to the sensory needs of children with autism spectrum disorder. In an embodiment, the material of the first part 102 may be selected such that it may be comfortable to wear for certain periods of time. Embodiments, as described above, are exemplary in nature and the first part 102 may be made from any suitable material as per requirements. In some embodiments, the first part 102 may have different colors incorporated onto the material to make the use of the apparatus 100, fun for a child.

In an exemplary embodiment, the second part 104 may also be a fingerless glove having a body 105. The body 105 includes a wrist portion 122 including a wrist opening 122a. The wrist opening 122a receives a hand (not shown) of a second user. The wrist portion 122 may partially cover the wrist of the second user during use. The body 105 may enclose the hand of the second user.

The body 105 also includes five finger elements 124, 126, 128, 130 and 132. In some embodiments, the first finger element 124 may receive a thumb of the second user. The first finger element 124 further defines a first end opening 124a, which allows the thumb to extend therethrough. In an embodiment, the first finger element 124 may at least partly cover the thumb. In some embodiments, the second finger element 126 may receive an index finger of the second user. The second finger element 126 further defines a second end opening 126a, which allows the index finger to extend therethrough. In an embodiment, the second finger element 126 may at least partly cover the index finger. In some embodiments, the third finger element 128 may receive a middle finger of the second user. The third finger element 128 further defines a third end opening 128a, which allows the middle finger to extend therethrough. In an embodiment, the third finger element 128 may at least partly cover the middle finger. In some embodiments, the fourth finger element 130 may receive a ring finger of the second user. The fourth finger element 130 further defines a fourth end opening 130a, which allows the ring finger to extend therethrough. In an embodiment, the fourth finger element 130 may at least partly cover the ring finger. In some embodiments, the fifth finger element 132 may receive a little finger of the second user. The fifth finger element 132 further defines a fifth end opening 132a, which allows the little finger to extend therethrough. In an embodiment, the fifth finger element 132 may at least partly cover the little finger.

In an embodiment, the five finger elements 124, 126, 128, 130 and 132 may be separately manufactured and connected to the body 105 by various methods, such as sewing, hot seal, adhesives, and so forth. In an alternative embodiment, the five finger elements 124, 126, 128, 130 and 132 may be integrally manufactured with the body 105.

In some embodiments, the second part 104 may also define a dorsal section (not shown) and a palm section 134. The dorsal section may cover a dorsal part of the hand, while the palm section 134 may cover a palm of the hand. In an embodiment, the dorsal section and the palm section 134 may be separately manufactured and then connected to each other by various methods, such as sewing, hot seal, adhesives, and so forth. In an alternative embodiment, the dorsal section and the palm section 134 may be integrally manufactured.

In an embodiment, the second part 104 may be made from a fabric-like material. In various embodiments, the material of the second part 104 may include a natural or synthetic fabric, wool, leather, rubber, latex, neoprene, and so forth. In another embodiment, the second part 104 may be made from a material having certain textures, durability and varying properties, such as waterproof or water resistant and easy to clean property. In yet another embodiment, the second part 104 may be made from a material which is flexible or elastic enough to allow the second part 104 to adapt to hands of different sizes. In an embodiment, the second part 104 may be designed in various sizes (i.e., small, medium, and large). In an exemplary embodiment, the second part 104 may be designed with an average size of a child's hand. Alternatively, the second part 104 may be designed with an average size of an adult's hand. In an exemplary embodiment, the second part 104 may be have a weight of 5-10 grams. Further, the second part 104 may comply with safety specifications of autism. In some embodiments, the material of the second part 104 may be able to withhold temperatures of between −40 degrees C. and +40 degrees C.

In an embodiment, the material of the second part 104 may include 100 percent soft cotton, with no labels that is attuned to the sensory need of children with autism spectrum disorder. In an embodiment, the material of the second part 104 may be selected such that it may be comfortable to wear for certain periods of time. Embodiments, as described above, are exemplary in nature and second part 104 may be made from any suitable material as per requirements. In some embodiments, the second part 104 may have different colors incorporated onto the material to make the use of the apparatus 100 fun for a child. In an exemplary embodiment, the first part 102 may be attached to the second part 104 such that the palm section 120 of the first part 102 may abut the dorsal section of the second part 104. In some embodiments, the sides of the first part 102 may be attached to the sides of the second part 104. As shown in FIG. 1C, an attachment region between the first part 102 and the second part 104 is highlighted by a reference numeral 136. In an exemplary embodiment, the bodies 103 and 105 including the finger elements of each of the first part 102 and the second part 104 may be attached to each other, while the wrist portions 106 and 122 remain free. Therefore, the apparatus 100 provides minimum attachment between the first and second parts 102, 104 to allow greater movement and flexibility. The first part 102 and the second part 104 may be attached to each other by any suitable attachment methods such as, but not limited to, sewing, heat seal, Velcro® and so forth. In an embodiment, the first user may be an adult or a guide, while the second user may be a child or a student. The child or the student may be suffering from a disease or a neurological disorder, such as autism. The apparatus 100 may allow the first user to control the movements of the second user. Further, the apparatus 100 may prevent or reduce skin to skin contact between the first user and the second user. Therefore, the apparatus 100 may be useful for training children/students who have high sensitivity to touch.

In an exemplary embodiment, the apparatus 100 may provide an easy to use structure for the child and the adult. The apparatus 100 may assist the guide to teach the child essential self-care things. In an embodiment, the apparatus 100 may improve life and learning for a child. The apparatus 100 may be used in households, schools, training centers and so forth. In some embodiments, the apparatus 100 may be lightweight, with low packaging and shipping costs. Therefore, the apparatus 100 may be affordable and easily available to parents of learning disabled or autistic children. In an embodiment, the apparatus 100 may include a logo. In some embodiments, the apparatus 100 may be easily manufactured, reliable, cost effective, and durable. The apparatus 100 may be aesthetically pleasing to a child with autism spectrum disorder, or otherwise include design features having soothing or other beneficial effects for autistic persons. For example, an atypical color preference may be used, or a color coding adopted to promote learning, usage of visual patterns, etc.

Figure 2A:
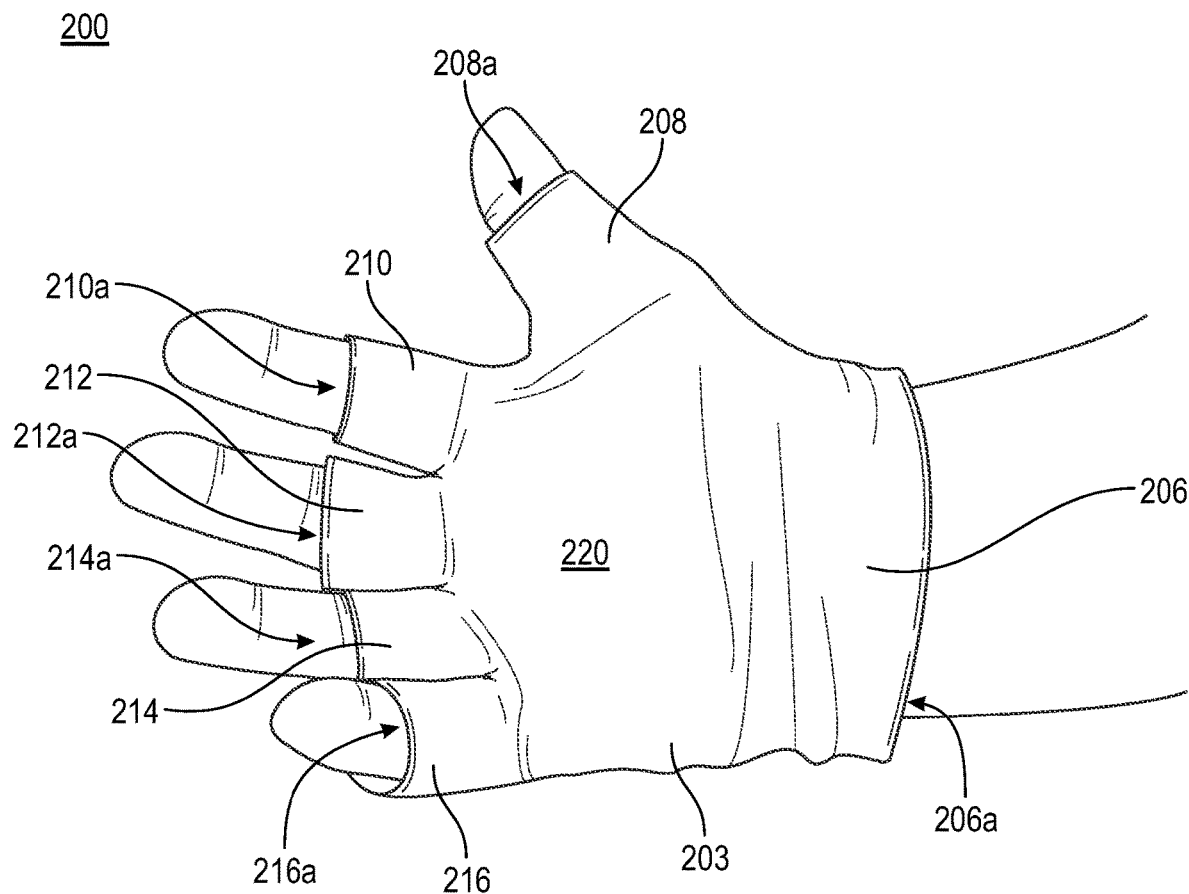
FIG. 2A illustrates a bottom view of a hand-over-hand apparatus in use, with one hand inserted therein, in accordance with an embodiment of the present disclosure.
Figure 2B:
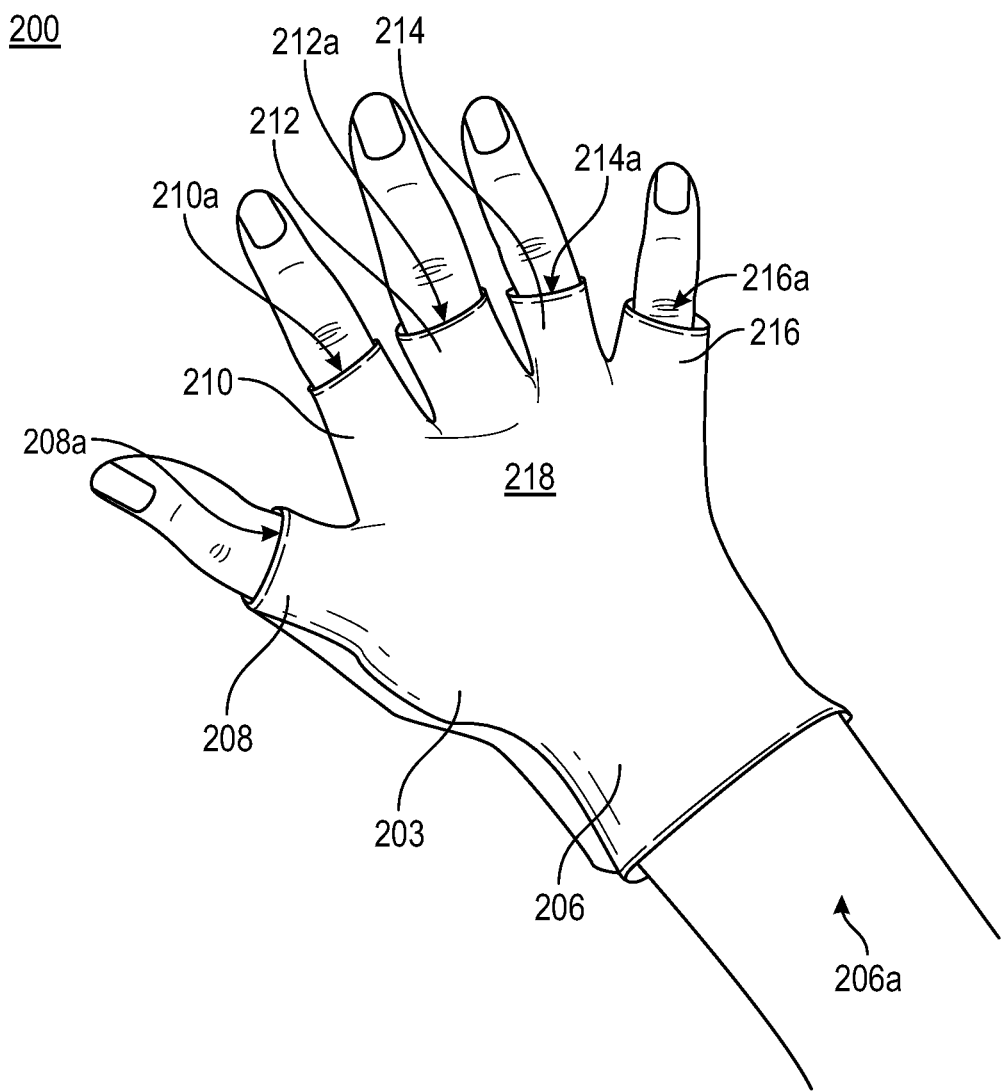
FIG. 2B illustrates a top view of the hand-over-hand apparatus of FIG. 2A, with one hand inserted therein.

FIG. 2A illustrates a bottom view of a hand-over-hand apparatus or device 200 (hereinafter referred to as "the apparatus 200") in use, in accordance with an embodiment of the present disclosure. FIG. 2B illustrates a top view of the apparatus 200. Referring to FIGS. 2A and 2B, the apparatus 200 may be a fingerless glove having a body 203. The body 203 may define an internal volume configured to at least partially receive therein a hand, a wrist and/or one or more fingers of two users. The body 203 includes a wrist portion 206 including a wrist opening 206a. In an exemplary embodiment, the wrist opening 206a may have a suitable diameter which may allow two hands of the two users to be simultaneously received within the body 203. In some embodiments, the wrist portion 206 may partially cover the wrist of both the users during use. The body 203 may also have suitable dimensions to enclose the hands of both the users.

The body 203 also includes five finger elements 208, 210, 212, 214 and 216. In some embodiments, the first finger element 208 may receive a thumb of the each of the users. The first finger element 208 further defines a first end opening 208a, which may allow the thumb of each user to extend therethrough. In an embodiment, the first finger element 208 may at least partly cover the thumbs of both the users. In some embodiments, the second finger element 210 may receive an index finger of each of the users. The second finger element 210 further defines a second end opening 210a, which allows the index fingers of both the users to extend therethrough. In an embodiment, the second finger element 210 may at least partly cover the index fingers of both the users. In some embodiments, the third finger element 212 may receive a middle finger of each of the users. The third finger element 212 further defines a third end opening 212a, which allows the middle finger of each of the users to extend therethrough. In an embodiment, the third finger element 212 may at least partly cover the middle fingers of both the users. In some embodiments, the fourth finger element 214 may receive a ring finger of each of the users. The fourth finger element 214 further defines a fourth end opening 214a, which allows the ring finger of each of the users to extend therethrough. In an embodiment, the fourth finger element 214 may at least partly cover the ring fingers of both the users. In some embodiments, the fifth finger element 216 may receive a little finger of each of the users. The fifth finger element 216 further defines a fifth end opening 216a, which allows the little finger of each user to extend therethrough. In an embodiment, the fifth finger element 216 may at least partly cover the little fingers of both the users.

In an embodiment, the five finger elements 208, 210, 212, 214 and 216 may be separately manufactured and connected to the body 203 by various methods, such as sewing, hot seal, adhesives, and so forth. In an alternative embodiment, the five finger elements 208, 210, 212, 214 and 216 may be integrally manufactured with the body 203.

In some embodiments, the apparatus 200 may also define a dorsal section 218 and a palm section 220. The dorsal section 218 may cover a dorsal part of the hand, while the palm section 220 may cover a palm of the hand. In an embodiment, the dorsal section 218 and the palm section 220 may be separately manufactured and then connected to each other by various methods, such as sewing, hot seal, adhesives, and so forth. In an alternative embodiment, the dorsal section 218 and the palm section 220 may be integrally manufactured.

In an embodiment, the apparatus 200 may be made from a fabric-like material. In various embodiments, the material of the apparatus 200 may include a natural or synthetic fabric, wool, leather, rubber, latex, neoprene, and so forth. In another embodiment, the apparatus 200 may be made from a material having certain textures, durability and varying properties, such as waterproof or water resistant and easy to clean property. In yet another embodiment, the apparatus 200 may be made from a material which is flexible or elastic enough to allow the apparatus 200 to receive the hands of two users simultaneously. Embodiments, as described above, are exemplary in nature and the apparatus 200 may be made from any suitable material as per requirements. In an embodiment, a first user may be an adult or a guide, while a second user may be a child or a student suffering from a disease or a neurological disorder, such as autism. The apparatus 200 may allow the first user to control the movements of the second user. Therefore, the apparatus 200 may allow the first user to teach the second user various skills such as, but not limited to, self-care tasks, handwriting skills, scissors skills, hand motor coordination and so forth.

Figure 3A:
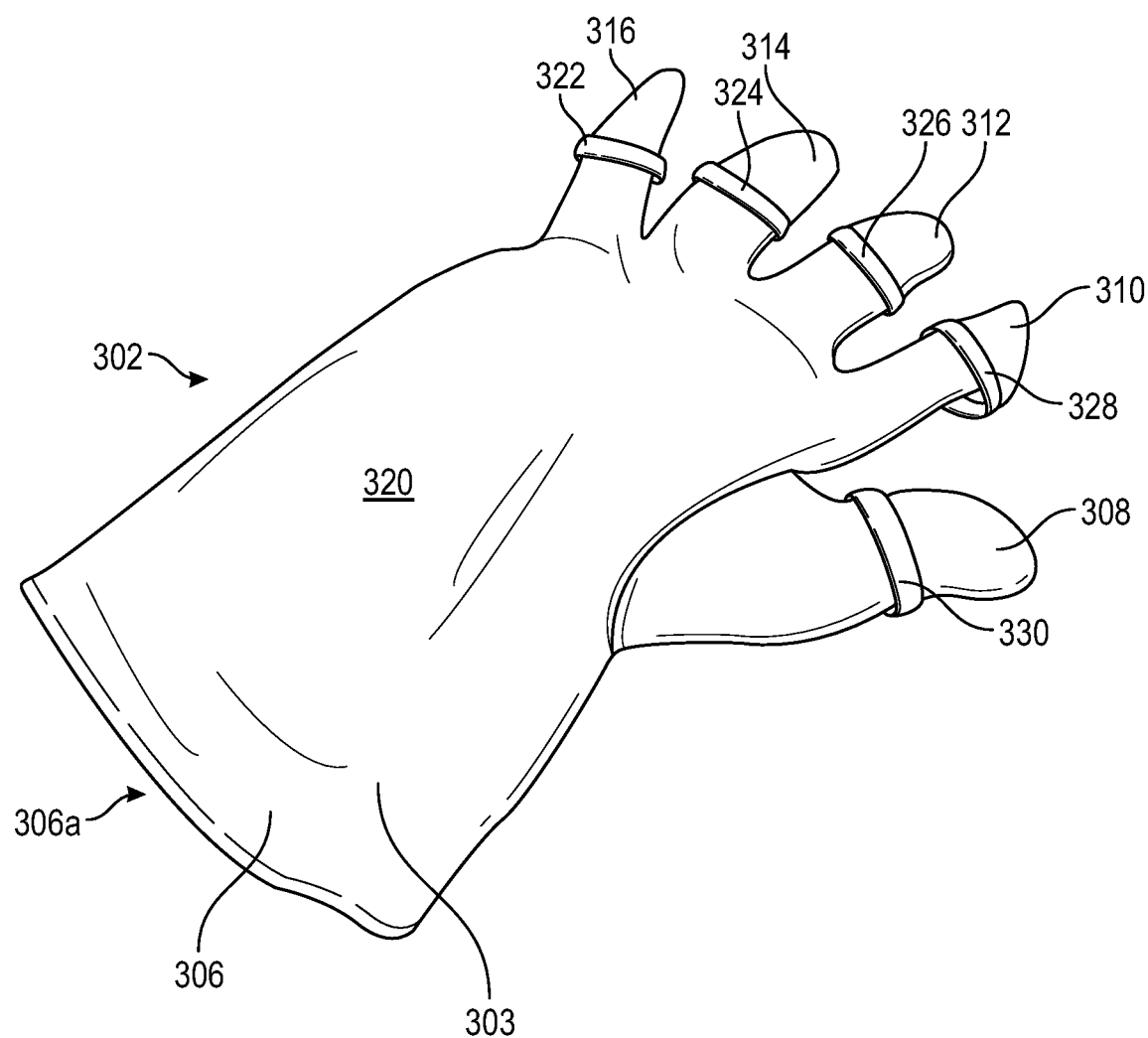
FIG. 3A illustrates a bottom perspective view of a hand-over-hand apparatus, in accordance with an embodiment of the present disclosure.
Figure 3B:
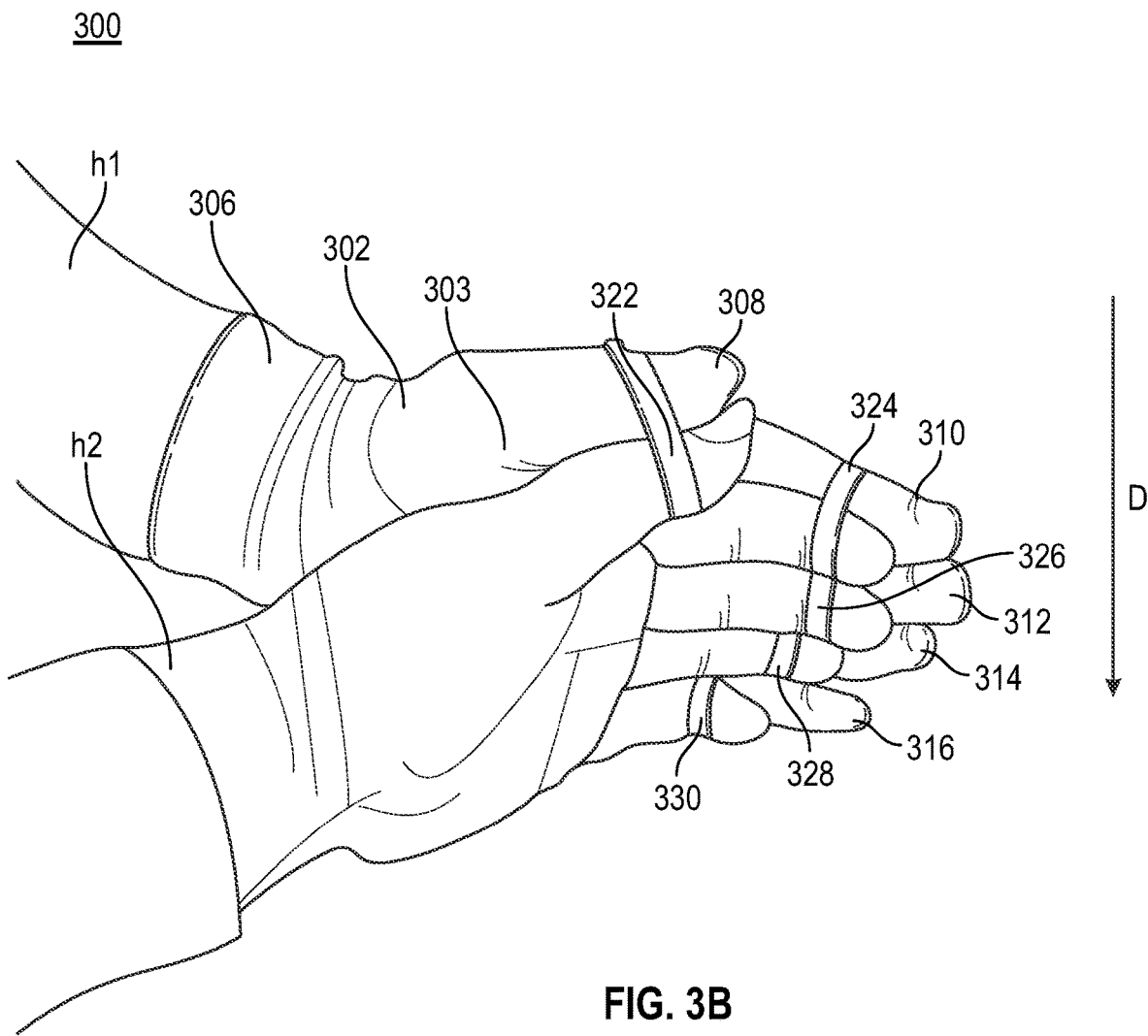
FIG. 3B illustrates a side perspective view of the hand-over-hand apparatus of FIG. 3A in use.
Figure 3C:
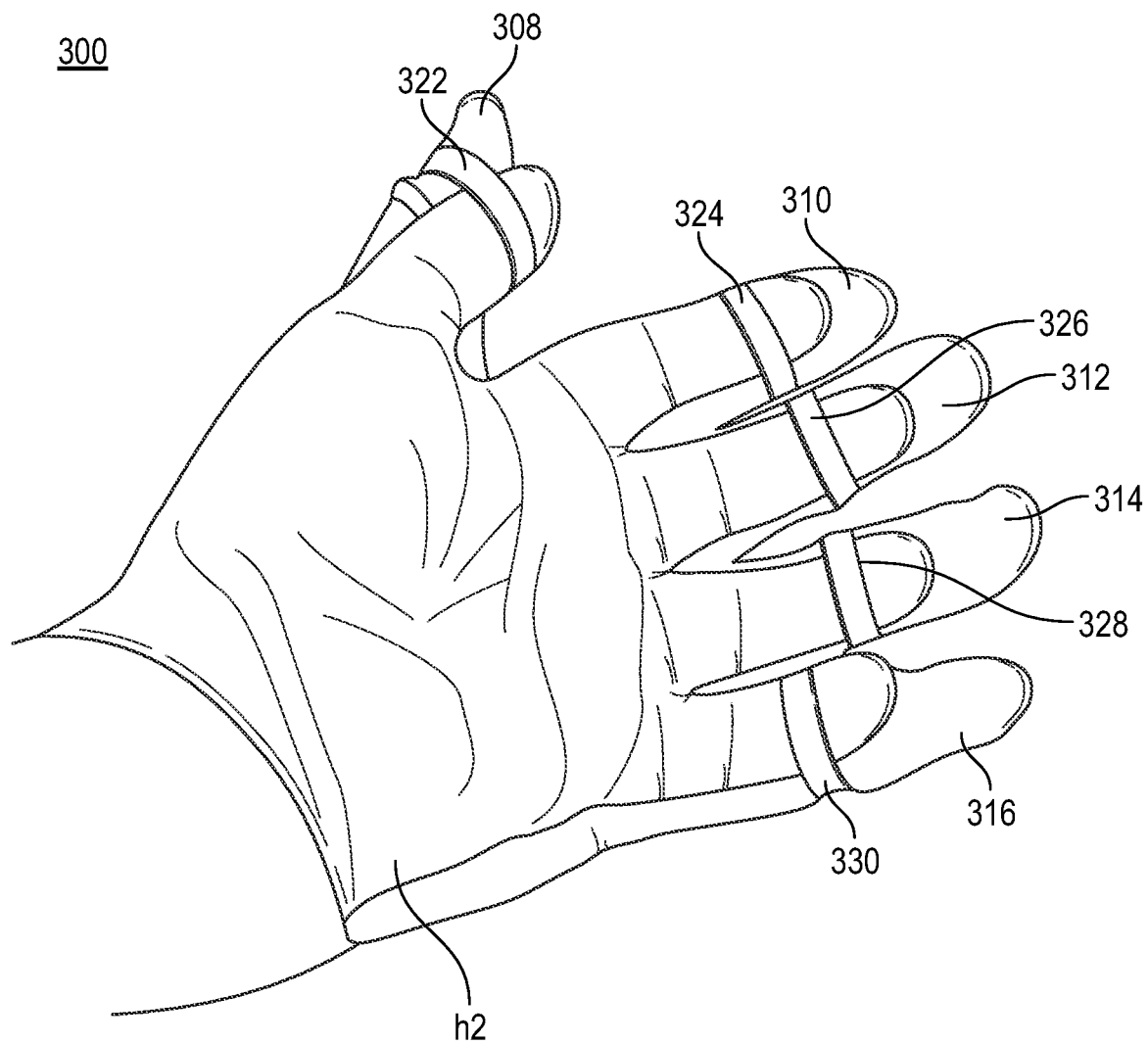
FIG. 3C illustrates a bottom perspective view of the hand-over-hand apparatus of FIG. 3A in use.
Figure 3D:
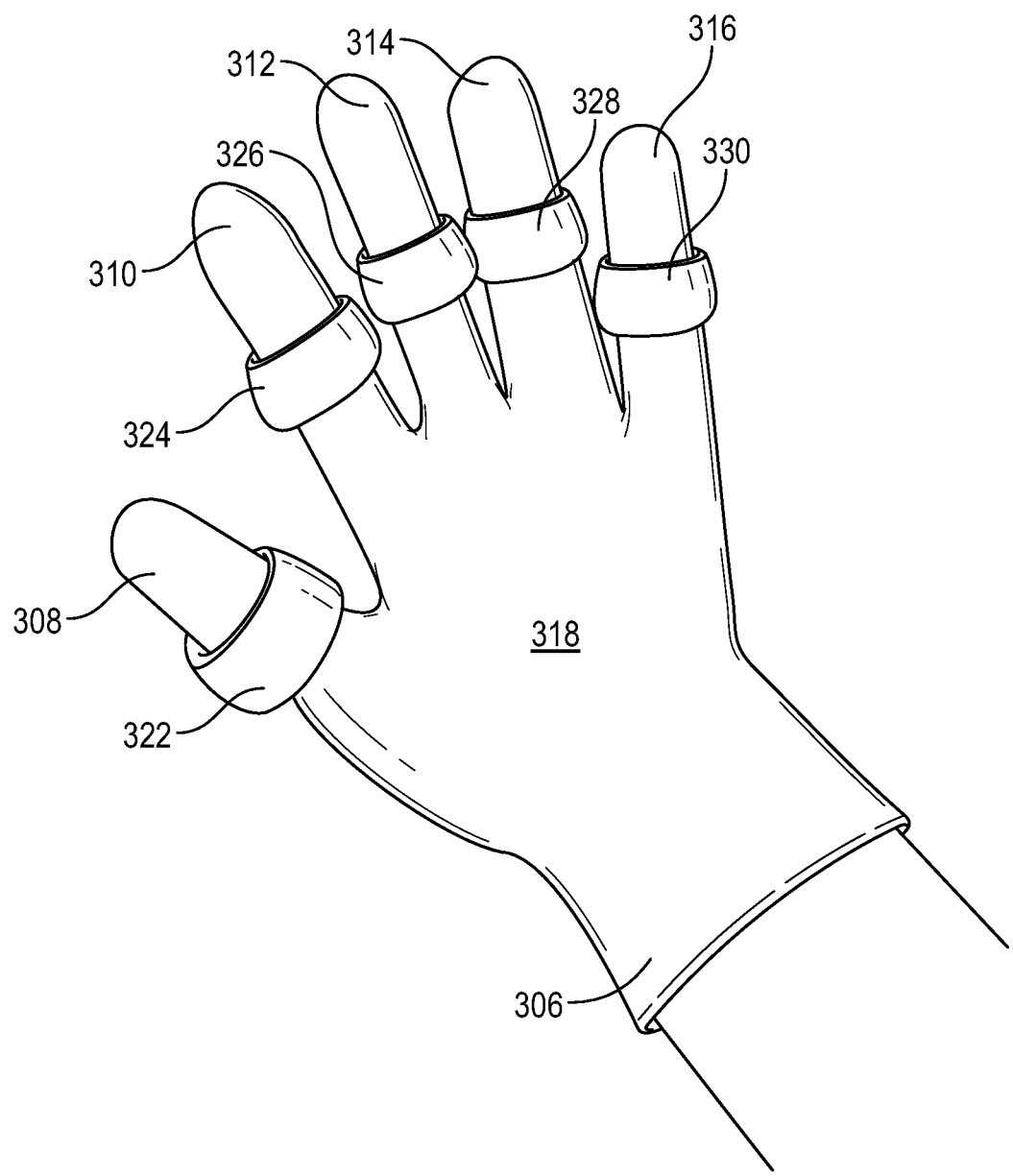
FIG. 3D illustrates a top view of the hand-over-hand apparatus of FIG. 3A.

FIG. 3A illustrates a bottom perspective view of a hand-over-hand apparatus or device 300 (hereinafter referred to as "the apparatus 300"), in accordance with an embodiment of the present disclosure. FIG. 3B illustrates a side perspective view of the apparatus 300 in use. FIG. 3C illustrates a bottom perspective view of the apparatus 300 in use. FIG. 3D illustrates a top view of the apparatus 300. Referring to FIGS. 3A-3D, the apparatus 300 may include a glove 302 having a body 303. The body 303 includes a wrist portion 306 including a wrist opening 306a. The wrist opening 306a allows a hand "h1" of a first user to be inserted into the glove 302. The wrist portion 306 may partially cover the wrist of the first user during use. The body 303 may enclose the hand "h1" of the first user.

The body 303 also includes five finger elements 308, 310, 312, 314 and 316. In some embodiments, the first finger element 308 may receive a thumb of the first user. In an exemplary embodiment, the first finger element 308 may define an enclosed volume configured to enclose the thumb of the first user. In some embodiments, the second finger element 310 may receive an index finger of the first user. In an exemplary embodiment, the second finger element 310 may define an enclosed volume configured to enclose the index finger of the first user. In some embodiments, the third finger element 312 may receive a middle finger of the first user. In an exemplary embodiment, the third finger element 312 may define an enclosed volume configured to enclose the middle finger of the first user. In some embodiments, the fourth finger element 314 may receive a ring finger of the first user. In an exemplary embodiment, the fourth finger element 314 may define an enclosed volume configured to enclose the ring finger of the first user. In some embodiments, the fifth finger element 316 may receive a little finger of the first user. In an exemplary embodiment, the fifth finger element 316 may define an enclosed volume configured to enclose the little finger of the first user.

In an embodiment, the five finger elements 308, 310, 312, 314 and 316 may be separately manufactured and connected to the body 303 by various methods, such as sewing, hot seal, adhesives, and so forth. In an alternative embodiment, the five finger elements 308, 310, 312, 314 and 316 may be integrally manufactured with the body 303.

In some embodiments, the glove 302 may also define a dorsal section 318 and a palm section 320. The dorsal section 318 may cover a dorsal part of the hand "h1", while the palm section 320 may cover a palm of the hand "h1". In an embodiment, the dorsal section 318 and the palm section 320 may be separately manufactured and then connected to each other by various methods, such as sewing, hot seal, adhesives, and so forth. In an alternative embodiment, the dorsal section 318 and the palm section 320 may be integrally manufactured.

In an embodiment, the glove 302 may be made from a fabric-like material. In various embodiments, the material of the glove 302 may include a natural or synthetic fabric, wool, leather, rubber, latex, neoprene, and so forth. In another embodiment, the glove 302 may be made from a material having certain textures, durability and varying properties, such as waterproof or water resistant and easy to clean property. In yet another embodiment, the glove 302 may be made from a material which is flexible or elastic enough to allow the glove 302 to accommodate hands of different sizes. Embodiments, as described above, are exemplary in nature and the glove 302 may be made from any suitable material as per requirements.

In an exemplary embodiment, the apparatus 300 may also include five material bands 322, 324, 326, 328, and 330 attached to the corresponding five finger elements 308, 310, 312, 314 and 316 of the glove 302. The material of the material bands may include an elastic material and/or a fabric material. The material bands 322, 324, 326, 328, and 330 may be attached to the glove 302 in a direction "D" relative to the palm section 320. In an exemplary embodiment, the material band 322 may be attached to the first finger element 308 by any suitable attachment methods, such as, but not limited to, sewing, hot seal, Velcro®, adhesive and so forth. In some embodiments, the material band 322 may be attached at sides of the first finger element 308. Further, the first material band 322 may form a closed loop in the direction "D". Therefore, the first material band 322 may extend beneath the first finger element 308. In another embodiment, the first material band 322 may form a fully closed loop around the first finger element 308. The first material band 322 may also be reversed around the first finger element 308, so that the first material band 322 extends in a direction opposite to the direction "D". Therefore, in the reverse configuration, the first material band 322 may extend on top of the first finger element 308. In an exemplary embodiment, the first material band 322 may receive a thumb of a second user. In a further embodiment, the first material band 322 may allow the second user to slidably insert the thumb beneath the thumb of the first user. In an alternative embodiment, the first material band 322 may allow the second user to slidably insert the thumb on top of the thumb of the first user.

In an exemplary embodiment, the second material band 324 may be attached to the second finger element 310 by any suitable attachment methods, such as, but not limited to, sewing, hot seal, Velcro® hook and loop fasteners, adhesives and so forth. In some embodiments, the second material band 324 may be attached at sides of the second finger element 310. Further, the second material band 324 may form a closed loop in the direction "D". Therefore, the second material band 324 may extend beneath the first finger element 308. In an exemplary embodiment, the second material band 324 may receive an index finger of the second user. In a further embodiment, the second material band 324 may allow the second user to slidably insert the index finger beneath the index finger of the first user. In some embodiments, the second material band 324 may form a fully closed loop around the second finger element 310. The second material band 324 may also be reversed around the second finger element 310, so that the second material band 324 extends in a direction opposite to the direction "D". Therefore, in the reverse configuration, the second material band 324 may extend on top of the second finger element 310. In an embodiment, the second material band 324 may allow the second user to position the index finger on top of the index finger of the first user.

In an exemplary embodiment, the third material band 326 may be attached to the third finger element 312 by any suitable attachment methods, such as, but not limited to, sewing, hot seal, Velcro®, adhesive and so forth. In some embodiments, the third material band 326 may be attached at sides of the third finger element 312. Therefore, the third material band 326 may form a closed loop in the direction "D". Further, the third material band 326 may extend beneath the third finger element 312. In an exemplary embodiment, the third material band 326 may receive a middle finger of the second user. In a further embodiment, the third material band 326 may allow the second user to slidably insert the middle finger beneath the middle finger of the first user. In some embodiments, the third material band 326 may form a fully closed loop around the third finger element 312. The third material band 326 may also be reversed around the third finger element 312, so that the third material band 326 extends in a direction opposite to the direction "D". Therefore, in the reverse configuration, the third material band 326 may extend on top of the third finger element 312. As a result, the third material band 326 may also allow the second user to position the middle finger on top of the middle finger of the first user.

In an exemplary embodiment, the fourth material band 328 may be attached to the fourth finger element 314 by any suitable attachment methods, such as, but not limited to, sewing, hot seal, Velcro®, adhesive and so forth. In some embodiments, the fourth material band 328 may be attached at sides of the fourth finger element 314. Therefore, the fourth material band 328 may form a closed loop in the direction "D". Further, the fourth material band 328 may extend beneath the fourth finger element 314. In an exemplary embodiment, the fourth material band 328 may receive a ring finger of the second user. In a further embodiment, the fourth material band 328 may allow the second user to slidably insert the ring finger beneath the ring finger of the first user. In some embodiments, the fourth material band 328 may form a fully closed loop around the fourth finger element 314. Therefore, the fourth material band 328 can be reversed around the fourth finger element 314 in order to allow the second user to position the ring finger on top of the ring finger of the first user.

In an exemplary embodiment, the fifth material band 330 may be attached to the fifth finger element 316 by any suitable attachment methods, such as, but not limited to, sewing, hot seal, Velcro®, adhesive and so forth. In some embodiments, the fifth material band 330 may be attached at sides of the fifth finger element 316. Therefore, the fifth material band 330 may form a closed loop in the direction "D". Further, the fifth material band 330 may extend beneath the fifth finger element 316. In an exemplary embodiment, the fifth material band 330 may receive a little finger of the second user. In a further embodiment, the fifth material band 330 may allow the second user to slidably insert the little finger beneath the little finger of the first user. In some embodiments, the fifth material band 330 may form a fully closed loop around the fifth finger element 316. Therefore, the fifth material band 330 may be reversed around the fifth finger element 316 to allow the second user to position the little finger on top of the little finger of the first user.

In various embodiments, a material of each of the material bands 322, 324, 326, 328, and 330 includes an elastic fabric, rubber, latex, neoprene, and so forth.

As illustrated in FIGS. 3A-3D, the material bands 322, 324, 326, 328, and 330 may be configured to secure the hand "h2" of the second user under the hand "h1" of the first user. Alternatively, the material bands 322, 324, 326, 328, and 330 may also be configured to secure the hand "h2" of the second user on top of the hand "h1" of the first user.

In an embodiment, the first user may be an adult or a guide, while the second user may be a child or a student. The apparatus 300 may allow the first user to control the movements of the second user. Therefore, the apparatus 300 allows the first user to teach the second user various skills such as, but not limited to, self-care tasks, handwriting skills, scissors skills, hand motor coordination and so forth.

In alternative embodiments, the first user may wear the material bands 322, 324, 326, 328, and 330, while the second user may wear the glove 302.

Figure 4A:
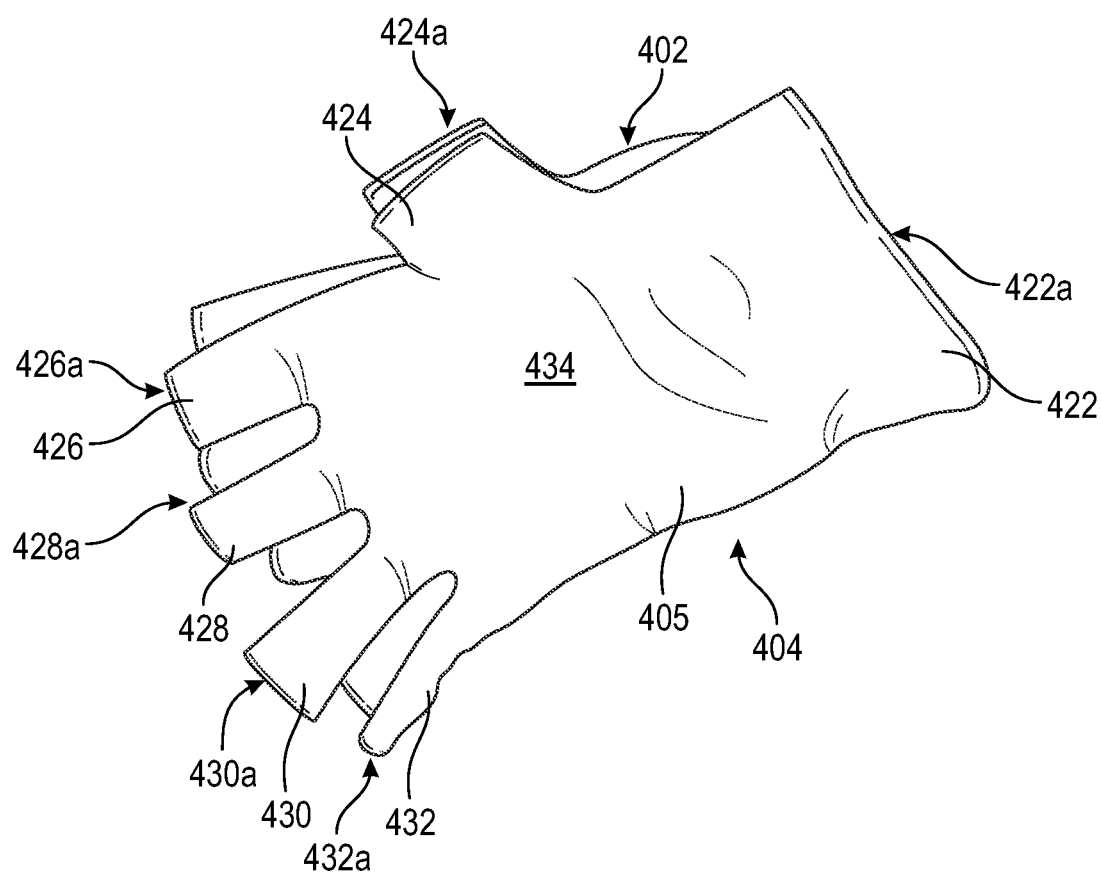
FIG. 4A illustrates a top perspective view of a hand-over-hand apparatus, in accordance with an embodiment of the present disclosure.
Figure 4B:
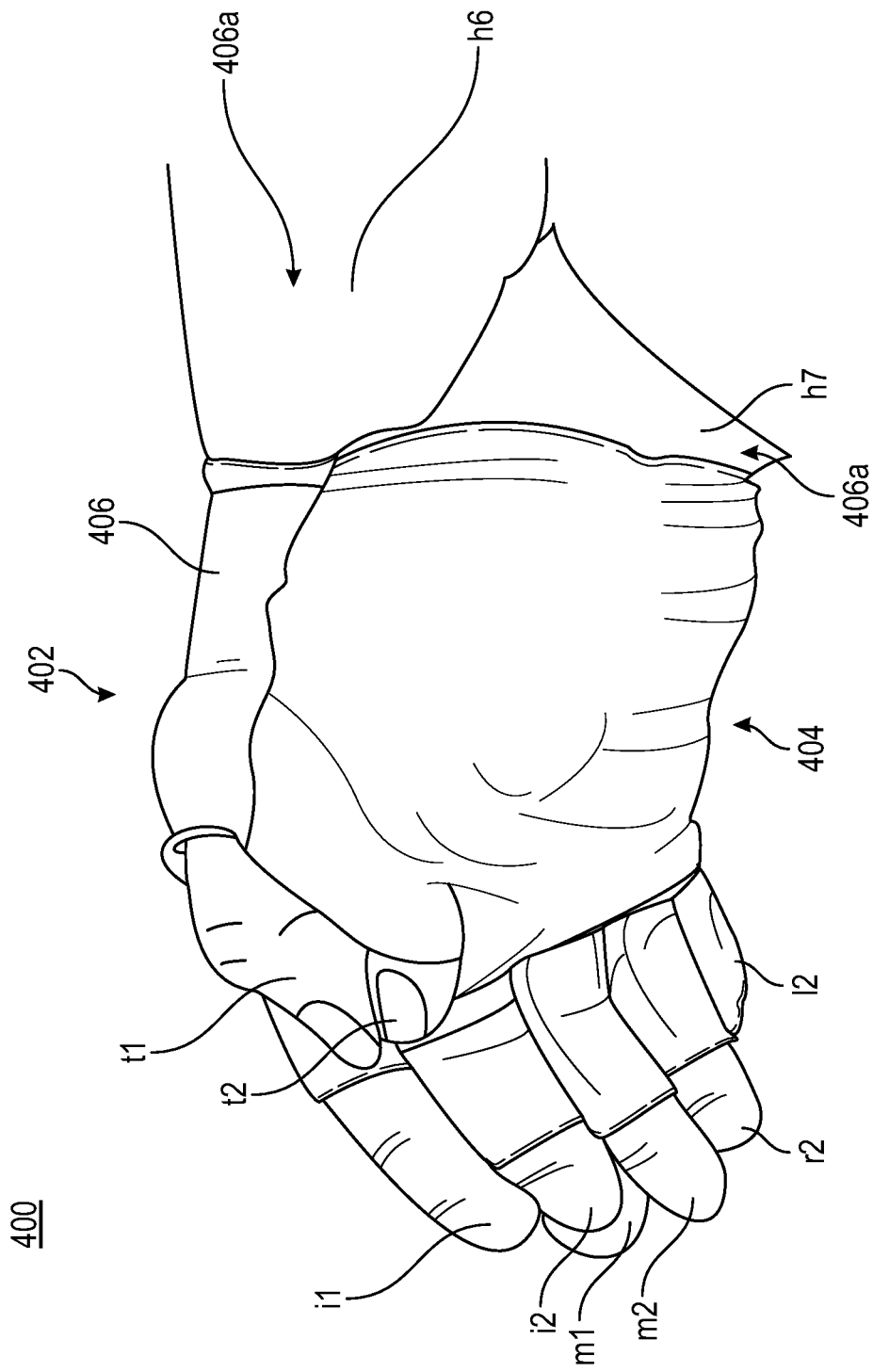
FIG. 4B illustrates a side perspective view of the hand-over-hand apparatus of FIG. 4A in use.
Figure 4C:
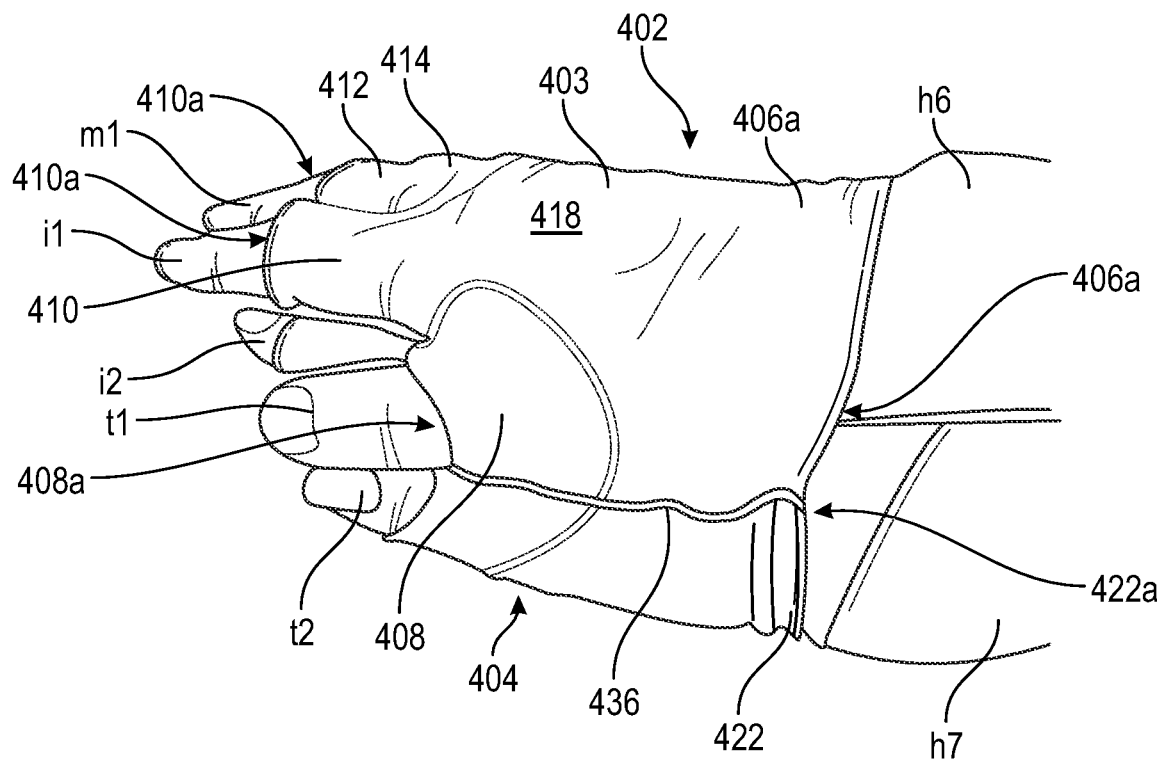
FIG. 4C illustrates another side perspective view of the hand-over-hand apparatus of FIG. 4A in use.
Figure 4D:
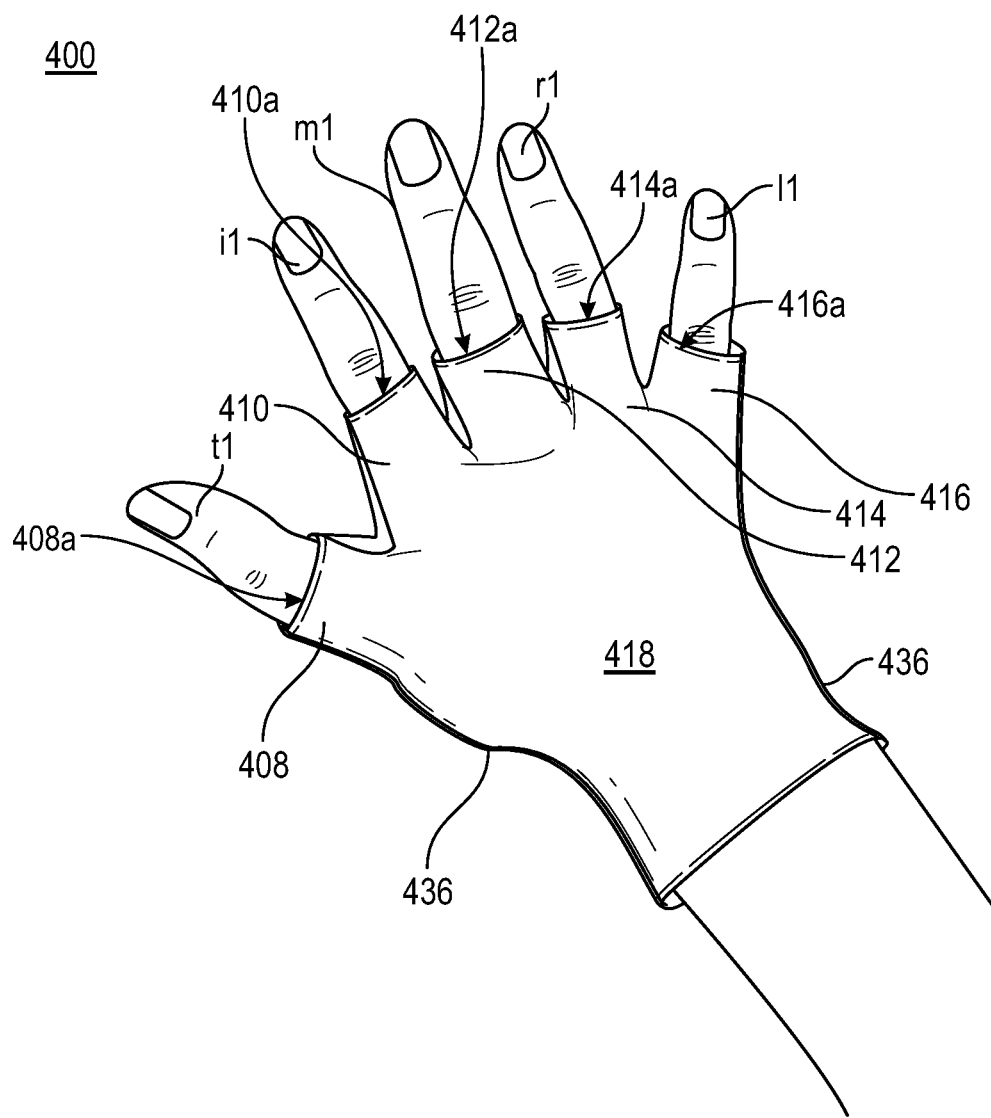
FIG. 4D illustrates a top view of the hand-over-hand apparatus of FIG. 4A in use.

FIG. 4A illustrates a perspective view of a hand-over-hand apparatus or device 400 (hereinafter referred to as "the apparatus 400"), in accordance with an embodiment of the present disclosure. FIG. 4B illustrates a side perspective view of the apparatus 400 in use. FIG. 4C illustrates another side perspective view of the apparatus 400 in use. FIG. 4D illustrates a top view of the apparatus 400 in use. The apparatus 400 may be similar to the apparatus 100 (as shown in FIGS. 1A-1C). Referring to FIGS. 4A-4D, the apparatus 400 includes a first part 402 and a second part 404. In an exemplary embodiment, the first part 402 may be a fingerless glove having a body 403. The body 403 includes a wrist portion 406 including a wrist opening 406a. The wrist opening 406a receives a hand "h6" of a first user. The wrist portion 406 may partially cover the wrist of the user in use. The body 403 may enclose the hand "h6" of the first user. The body 403 also includes five finger elements 408, 410, 412, 414 and 416. In some embodiments, the first finger element 408 may receive a thumb "t1" of the first user. The first finger element 408 further defines a first end opening 408a, which allows the thumb "t1" to extend therethrough. In an embodiment, the first finger element 408 may at least partly cover the thumb "t1". In some embodiments, the second finger element 410 may receive an index finger "i1" of the first user. The second finger element 410 further defines a second end opening 410a, which allows the index finger "i1" to extend therethrough. In an embodiment, the second finger element 410 may at least partly cover the index finger "i1". In some embodiments, the third finger element 412 may receive a middle finger "m1" of the first user. The third finger element 412 further defines a third end opening 412a, which allows the middle finger "m1" to extend therethrough. In an embodiment, the third finger element 412 may at least partly cover the middle finger "m1". In some embodiments, the fourth finger element 414 may receive a ring finger "r1" of the first user. The fourth finger element 414 further defines a fourth end opening 414a, which allows the ring finger "r1" to extend therethrough. In an embodiment, the fourth finger element 414 may at least partly cover the ring finger "r1". In some embodiments, the fifth finger element 416 may receive a little finger "l1" of the first user. The fifth finger element 416 further defines a fifth end opening 416a, which allows the little finger "l1" to extend therethrough. In an embodiment, the fifth finger element 416 may at least partly cover the little finger "l1". In some embodiments, the first part 402 may also define a dorsal section 418 and palm section (not shown).

In an embodiment, the first part 402 may be made from a fabric-like material. In another embodiment, the first part 402 may be made from a material having certain textures, durability and varying properties, such as waterproof or water resistant and easy to clean property. In yet another embodiment, the first part 402 may be made from a material which is flexible enough to allow the first part 402 to adapt to hands of different sizes. Embodiments, as described above, are exemplary in nature and the first part 402 may be made from any suitable material as per requirements.

In an exemplary embodiment, the second part 404 may also be a fingerless glove having a body 405. The body 405 includes a wrist portion 422 including a wrist opening 422a. The wrist opening 422a receives a hand "h7" of a second user. The wrist portion 422 may partially cover the wrist of the second user during use. The body 405 may enclose the hand "h7" of the second user. The body 405 also includes five finger elements 424, 426, 428, 430 and 432. In some embodiments, the first finger element 424 may receive a thumb "t2" of the second user. The first finger element 424 further defines a first end opening 424a, which allows the thumb "t2" to extend therethrough. In an embodiment, the first finger element 424 may at least partly cover the thumb "t2". In some embodiments, the second finger element 426 may receive an index finger "i2" of the second user. The second finger element 426 further defines a second end opening 426a, which allows the index finger "i2" to extend therethrough. In an embodiment, the second finger element 426 may at least partly cover the index finger "i2". In some embodiments, the third finger element 428 may receive a middle finger "m2" of the second user. The third finger element 428 further defines a third end opening 428a, which allows the middle finger "m2" to extend therethrough. In an embodiment, the third finger element 428 may at least partly cover the middle finger "m2". In some embodiments, the fourth finger element 430 may receive a ring finger "r2" of the second user. The fourth finger element 430 further defines a fourth end opening 430a, which allows the ring finger "r2" to extend therethrough. In an embodiment, the fourth finger element 430 may at least partly cover the ring finger "r2". In some embodiments, the fifth finger element 432 may receive a little finger "l2" of the second user. The fifth finger element 432 further defines a fifth end opening 432a, which allows the little finger "l2" to extend therethrough. In an embodiment, the fifth finger element 432 may at least partly cover the little finger "l2". In some embodiments, the second part 404 may also define a dorsal section (not shown) and palm section 434.

In an embodiment, the second part 404 may be made from a fabric-like material. In another embodiment, the second part 404 may be made from a material having certain textures, durability and varying properties, such as waterproof or water resistant and easy to clean property. In yet another embodiment, the second part 404 may be made from a material which is flexible enough to accommodate hands of different sizes. Embodiments, as described above, are exemplary in nature and the second part 404 may be made from any suitable material as per requirements.

In an exemplary embodiment, the first part 402 may be attached to the second part 404 such that the palm section of the first part 402 may abut the dorsal section of the second part 404. In some embodiments, the sides of the first part 402 may be attached to the sides of the second part 404. As illustrated in FIG. 4D, an attachment region between the first part 402 and the second part 104 is shown by a reference numeral 436. As can be clearly seen in FIG. 4D, the finger elements 408, 410, 412, 414 and 416 of the first part 402 are attached to the corresponding finger elements 424, 426, 428, 430 and 432 of the second part 404. Further, the wrist portion 406 of the first part 402 may also be attached to the wrist portion 422 of the second part 404. Therefore, the apparatus 400 provides increased attachment between the first and second parts 402, 404, thereby allowing greater control. The first part 402 and the second part 404 may be attached to each other by any suitable attachment methods such as, but not limited to, sewing, heat seal, Velcro® and so forth. In an embodiment, the first user may be an adult or a guide, while the second user may be a child or a student suffering from a disease or a neurological disorder, such as autism. The apparatus 400 may allow the first user to control the movements of the second user. Further, the apparatus 400 may prevent or reduce skin to skin contact between the first user and the second user.

In an embodiment, lengths of the finger elements 408, 410, 412, 414 and 416 of the first part 402 may be greater than lengths of the corresponding finger elements 108, 110, 112, 114 and 116 of the first part 102 of the apparatus 100 (shown in FIGS. 1A to 1C). Similarly, lengths of the finger elements 424, 426, 428, 430 and 432 of the second part 404 may be greater than lengths of the corresponding finger elements 124, 126, 128, 130 and 132 of the second part 104 of the apparatus 100. Further, the first part 402 and the second part 404 may be attached to each other at the sides of the corresponding finger elements and at the corresponding wrist portions 406 and 422. On the other hand, the first and second parts 102 and 104 of the apparatus 100 are connected only at the sides, and the wrist portions 106 and 122 are free from each other. Therefore, the apparatus 400 includes greater attachment between the first and second parts 402, 404, thereby providing greater control. On the other hand, the apparatus 100 provides lesser attachment to allow greater relative movement and flexibility between the first and second parts 102, 104.

Figure 5A:
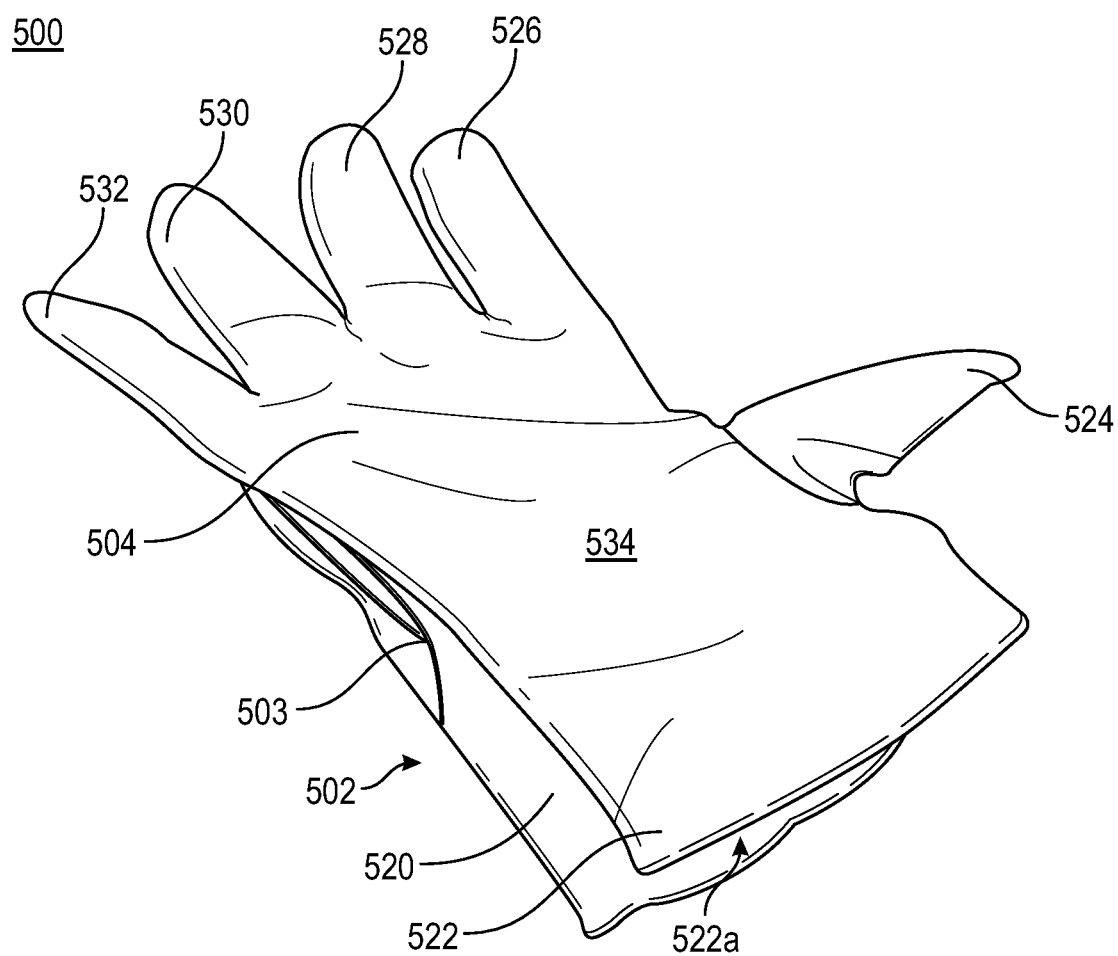
FIG. 5A illustrates a bottom perspective view of a hand-over-hand apparatus, in accordance with an embodiment of the present disclosure.
Figure 5B:
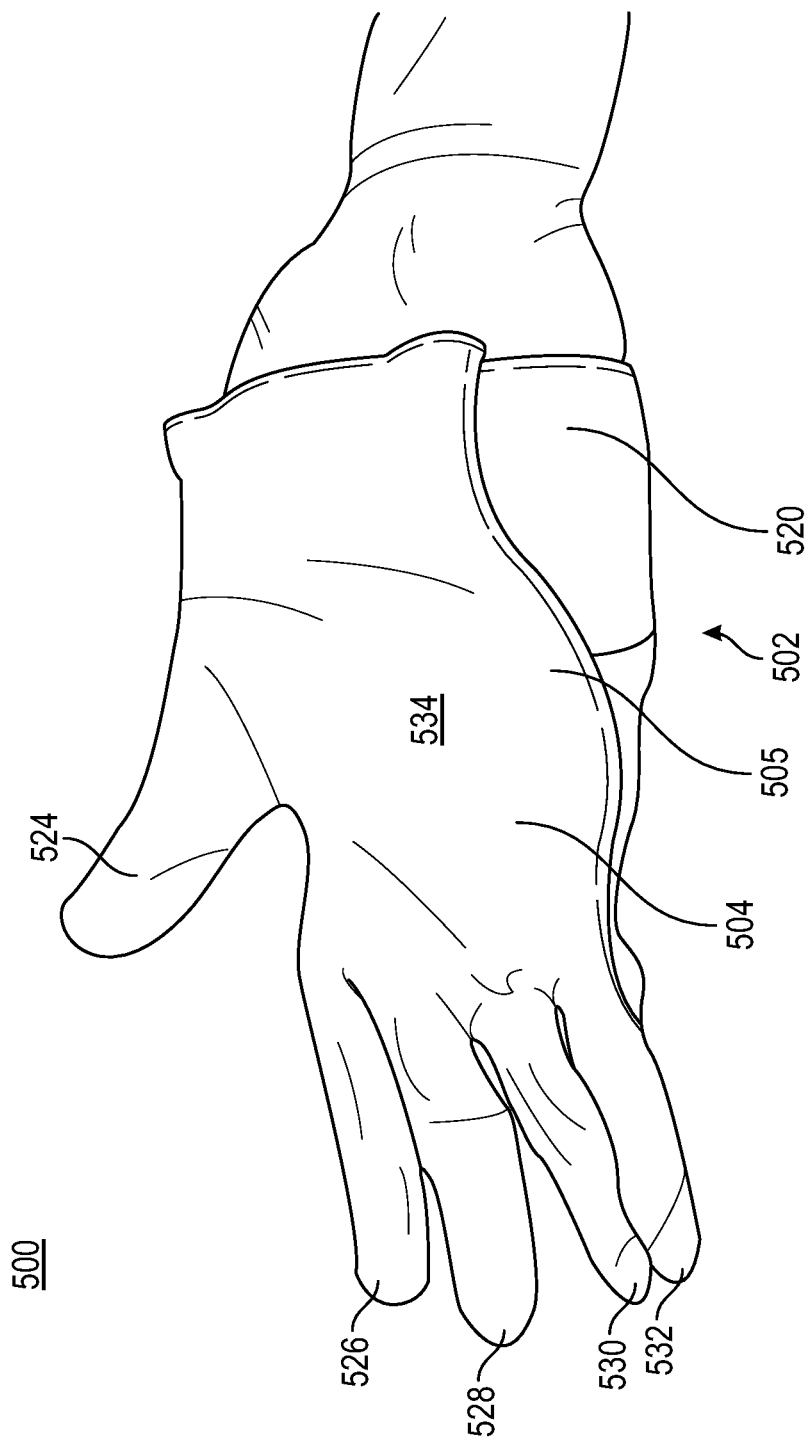
FIG. 5B illustrates a bottom perspective view of the hand-over-hand apparatus of FIG. 5A, with one of two hands visible.
Figure 5C:
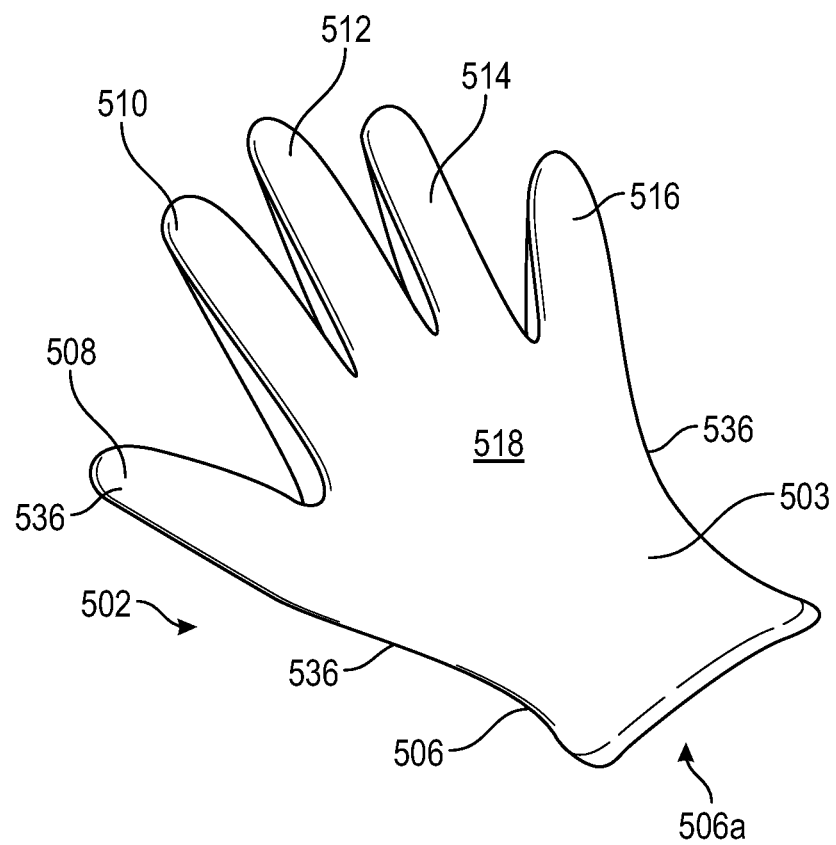
FIG. 5C illustrates a top view of the hand-over-hand apparatus of FIG. 5A.

FIG. 5A illustrates a bottom perspective view of a hand-over-hand apparatus or device 500 (hereinafter referred to as "the apparatus 500"), in accordance with an embodiment of the present disclosure. FIG. 5B illustrates a bottom perspective view of the apparatus 500 with one hand inserted therein. FIG. 5C illustrates a top view of the apparatus 500. In an exemplary embodiment, the apparatus 500 may include a first glove 502 and a second glove 504. The first glove 502 may be configured to receive a hand of a first user. The first glove 502 may include a body 503, a wrist portion 506, and five finger elements 508, 510, 512, 514 and 516. The wrist portion 506 includes a wrist opening 506a. The wrist opening 506a allows the hand of the first user to be inserted within the body 503. The wrist portion 506 may partially cover the wrist of the first user during use. The body 503 may enclose the hand of the first user. In some embodiments, the body 503 may include the five finger elements 508, 510, 512, 514 and 516. In some embodiments, the first finger element 508 may receive a thumb of the first user. In an exemplary embodiment, the first finger element 508 may define an enclosed volume configured to enclose the thumb of the first user. In some embodiments, the second finger element 510 may receive an index finger of the first user. In an exemplary embodiment, the second finger element 510 may define an enclosed volume configured to enclose the index finger of the first user. In some embodiments, the third finger element 512 may receive a middle finger of the first user. In an exemplary embodiment, the third finger element 512 may define an enclosed volume configured to enclose the middle finger of the first user. In some embodiments, the fourth finger element 514 may receive a ring finger of the first user. In an exemplary embodiment, the fourth finger element 514 may define an enclosed volume configured to enclose the ring finger of the first user. In some embodiments, the fifth finger element 516 may receive a little finger of the first user. In an exemplary embodiment, the fifth finger element 516 may define an enclosed volume configured to enclose the little finger of the first user. In some embodiments, the first glove 502 may also define a dorsal section 518 and a palm section 520.

In an embodiment, the first glove 502 may be made from a fabric-like material. In another embodiment, the first glove 502 may be made from a material having certain textures, durability and varying properties, such as waterproof or water resistant and easy to clean property. In yet another embodiment, the first glove 502 may be made from a material which is flexible enough to allow the first glove 502 to accommodate hands of different sizes.

In an exemplary embodiment, the second glove 504 may be similar to the first glove 502. Therefore, similar parts are not described in detail hereinafter. The second glove 504 may be configured to receive a hand of a second user. The second glove 504 may include a body 505, a wrist portion 522, and five finger elements 524, 526, 528, 530 and 532. The wrist portion 522 includes a wrist opening 522a. The wrist opening 522a allows the hand of the second user to be inserted within the second glove 504. The wrist portion 522 may partially cover the wrist of the second user during use. In an exemplary embodiment, the five finger elements 524, 526, 528, 530 and 532 of the second glove 504 are similar to the corresponding five finger elements 508, 510, 512, 514 and 516 of the first glove 502. The five finger elements 524, 526, 528, 530 and 532 of the second glove 504 may enclose a thumb, an index finger, a middle finger, a ring finger and a little finger, respectively, of the second user. In some embodiments, the second glove 504 may also define a dorsal section (not shown) and a palm section 534.

In an embodiment, the second glove 504 may be made from a fabric-like material. In another embodiment, the second glove 504 may be made from a material having certain textures, durability and varying properties, such as waterproof or water resistant and easy to clean property. In yet another embodiment, the second glove 504 may be made from a material which is flexible enough to allow the second glove 504 to adapt to hands of different sizes.

In an exemplary embodiment, the first glove 502 may be attached to the second glove 504 such that the palm section 520 of the first glove 502 may abut the dorsal section of the second glove 504. In some embodiments, sides of the first glove 502 may be attached to sides of the second glove 504. Further, each finger element 508, 510, 512, 514 and 516 of the first glove 502 may be attached to the corresponding finger elements 524, 526, 528, 530 and 532 of the second glove 504. As shown in FIG. 5C, an attachment region between the first glove 502 and the second glove 504 is shown by a reference numeral 536. In some embodiments, the wrist portion 506 of the first glove 502 may also be attached to the wrist portion 522 of the second glove 504. Therefore, the apparatus 500 provides increased attachment to allow greater control. Further, the apparatus 500 may completely prevent skin to skin interaction between the first user and the second user. The first glove 502 and the second glove 504 may be attached to each other by any suitable attachment methods such as, but not limited to, sewing, heat seal, Velcro® and so forth. In an embodiment, the first user may be an adult or a guide, while the second user may be a child or a student. The apparatus 500 may allow the first user to control the movements of the second user. Alternatively, the first user may be a child or a student, while the second user may be an adult or a guide.

Figure 6A:
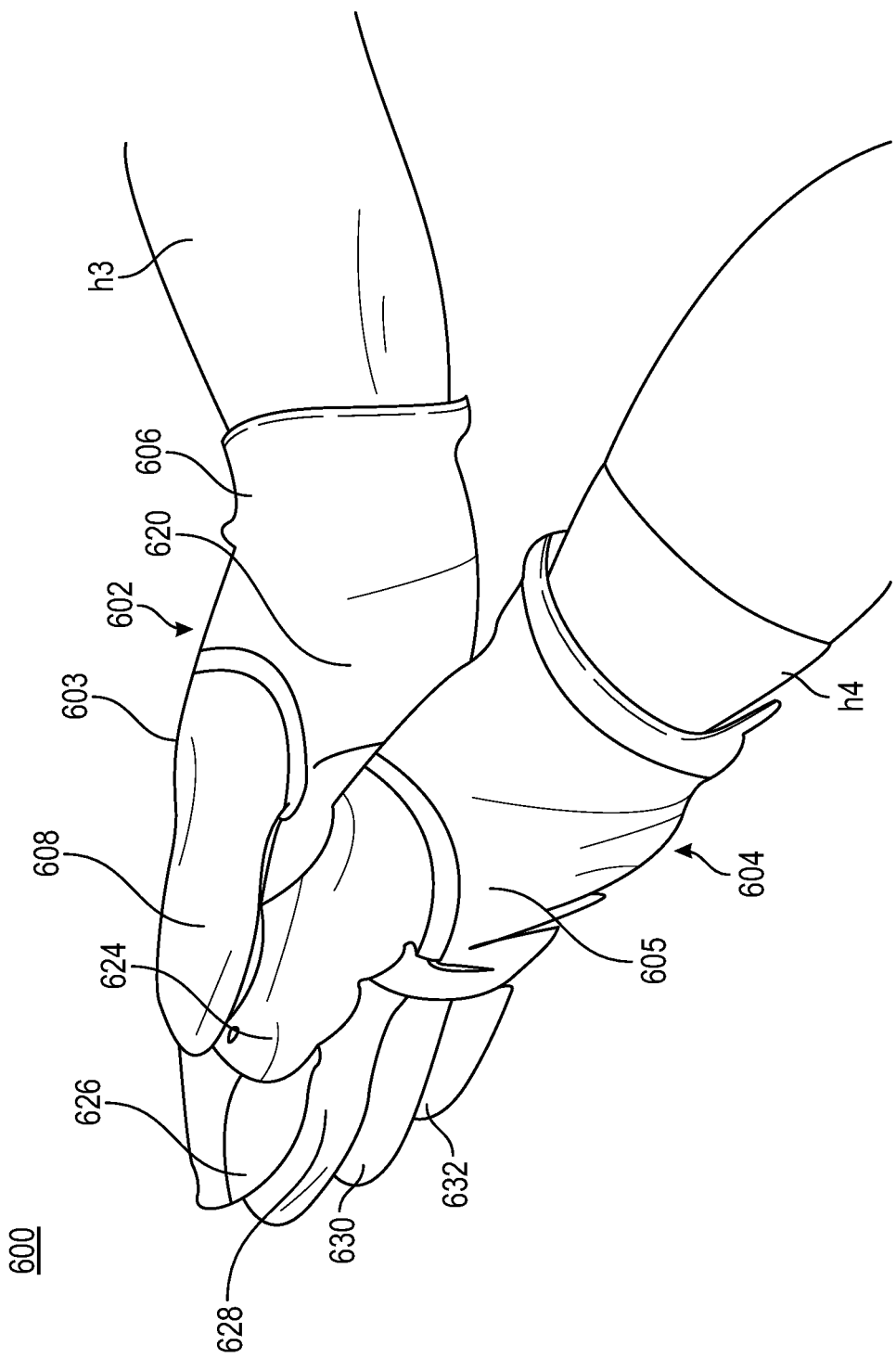
FIG. 6A illustrates a side perspective view of a hand-over-hand apparatus in use, in accordance with an embodiment of the present disclosure.
Figure 6B:
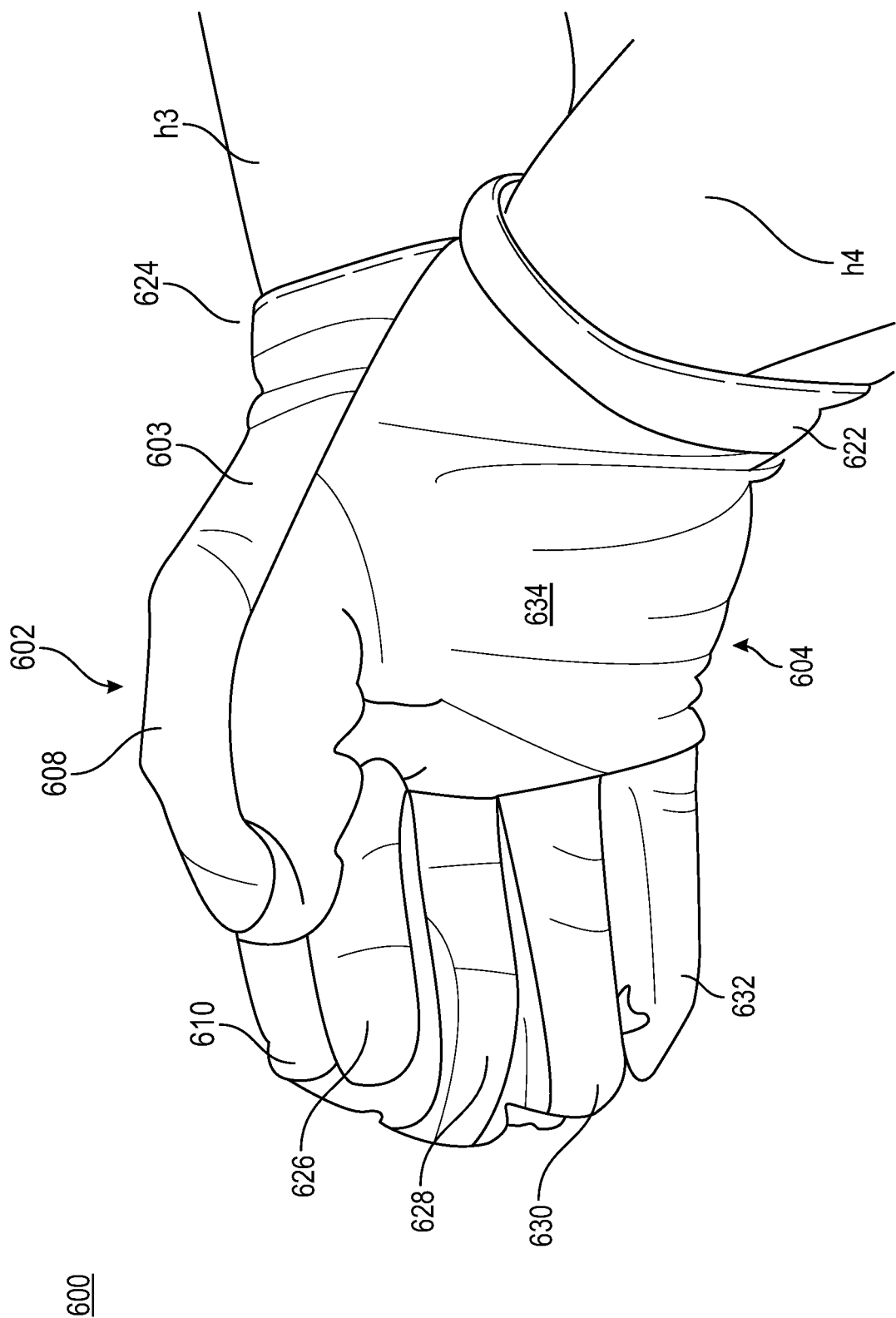
FIG. 6B illustrates a bottom perspective view of the hand-over-hand apparatus of FIG. 6A in use.
Figure 6C:
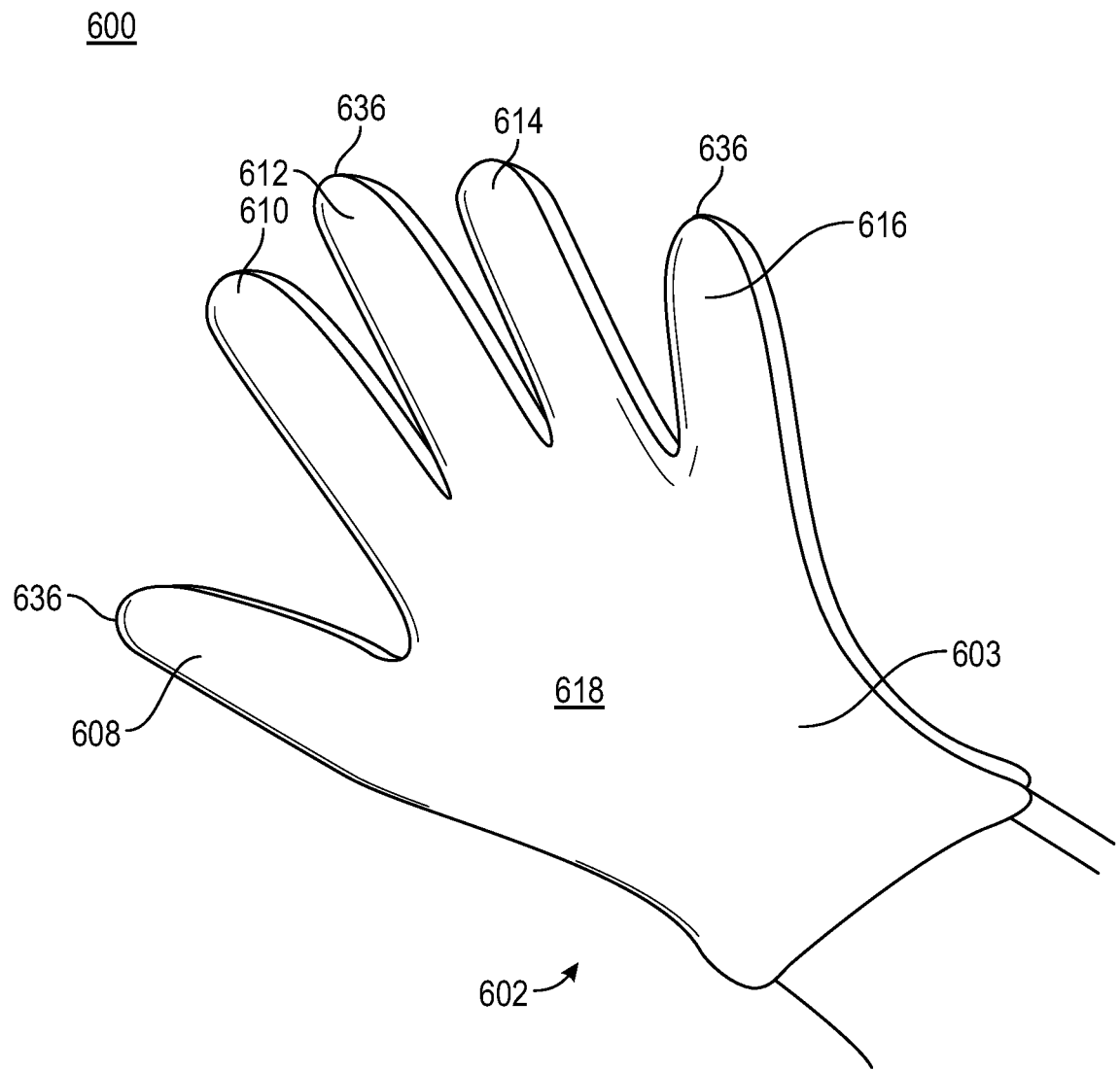
FIG. 6C illustrates a top view of the hand-over-hand apparatus of FIG. 6A.

FIG. 6A illustrates a side perspective view of a hand-over-hand apparatus or device 600 (hereinafter referred to as "the apparatus 600") in use, in accordance with an embodiment of the present disclosure. FIG. 6B illustrates a bottom perspective view of the apparatus 600. FIG. 6C illustrates a top view of the apparatus 600. The apparatus 600 may be similar to the apparatus 500 (as shown in FIGS. 5A-5C). Further, for the purposes of the present disclosure, similar parts are provided with corresponding reference numerals.

In an exemplary embodiment, the apparatus 600 may include a first glove 602 and a second glove 604. The first glove 602 may be configured to enclose a hand "h3" of a first user. The first glove 602 may include a body 603, a wrist portion 606, and five finger elements 608, 610, 612, 614 and 616. The wrist portion 606 includes a wrist opening (not shown). In some embodiments, the wrist opening allows the hand "h3" of the first user to be inserted within the body 603. The wrist portion 606 may partially cover the wrist of the first user during use. The body 603 may enclose the hand "h3" of the first user. In some embodiments, the body 603 may include the five finger elements 608, 610, 612, 614 and 616. The five finger elements 608, 610, 612, 614 and 616 of the first glove 602 may enclose a thumb, an index finger, a middle finger, a ring finger and a little finger, respectively, of the first user. In some embodiments, the first glove 602 may also define a dorsal section 618 and a palm section 620.

In an embodiment, the first glove 602 may be made from a fabric-like material. In another embodiment, the first glove 602 may be made from a material having certain textures, durability and varying properties, such as waterproof or water resistant and easy cleanability. In yet another embodiment, the first glove 602 may be made from a material which is flexible enough to allow the first glove 602 to accommodate hands of different sizes.

In an exemplary embodiment, the second glove 604 may be similar to the first glove 602. The second glove 604 may be configured to receive a hand "h4" of the second user. The second glove 604 may include a body 605, a wrist portion 622, and five finger elements 624, 626, 628, 630 and 632. The wrist portion 622 includes a wrist opening (not shown). The wrist opening receives the hand "h4" of the second user. The wrist portion 622 may partially cover the wrist of the first user during use. In an exemplary embodiment, the five finger elements 624, 626, 628, 630 and 632 of the second glove 604 are similar to the corresponding five finger elements 608, 610, 612, 614 and 616 of the first glove 602. The five finger elements 624, 626, 628, 630 and 632 of the second glove 604 may enclose a thumb, an index finger, a middle finger, a ring finger and a little finger, respectively, of the second user. In some embodiments, the second glove 604 may also define a dorsal section (not shown) and a palm section 634. In an embodiment, the second glove 604 may be made from a fabric-like material. In another embodiment, the second glove 604 may be made from a material having certain textures, durability and varying properties such as, waterproof or water resistant and easy to clean property. In yet another embodiment, the second glove 604 may be made from a material which is flexible enough to allow the second glove 604 to adapt to hands of different sizes.

In an exemplary embodiment, the first glove 602 may be attached to the second glove 604 such that the palm section 620 of the first glove 602 may face the dorsal section of the second glove 604. In an exemplary embodiment, the first glove 602 and the second glove 604 may only be attached at tips of the corresponding finger elements of the first glove 602 and the second glove 604. As illustrated in FIG. 6C, an attachment region of the first glove 602 and the second glove 604 is highlighted by a reference numeral 636. In an exemplary embodiment, the apparatus 600 may provide maximum movement and flexibility to each of the first user and the second user. Further, the apparatus 600 may completely prevent skin to skin interaction between the first user and the second user. Therefore, the apparatus 600 may be useful for training children/students who have high sensitivity to touch. Further, children/students having no experience of touching an external object (e.g., a pair of scissors) may also be trained with the apparatus 600. The first glove 602 and the second glove 604 may be attached to each other by any suitable attachment methods such as, but not limited to, sewing, heat seal, Velcro® and so forth. In some embodiments, additional attachments can also be provided by any suitable methods such as, but not limited to, Velcro®, to allow a desired control over hand movements. In an embodiment, the first user may be an adult or a guide, while the second user may be a child or a student. The apparatus 600 may allow the first user to control the movements of the second user. Alternatively, the first user may be a child or a student, while the second user may be an adult or a guide.

The first and second gloves 602, 604 may be attached only at the tips of the corresponding finger elements to allow maximum movement and flexibility to each of the first user and the second user. On the other hand, the first and second gloves 502, 504 (shown in FIGS. 5A to 5C) may be attached at the corresponding finger elements as well as the corresponding wrist portions to allow greater control.

In an embodiment, the first and second gloves 602, 604 may be made of a breathable fabric that minimizes sweating due to prolonged use.

Figure 7A:
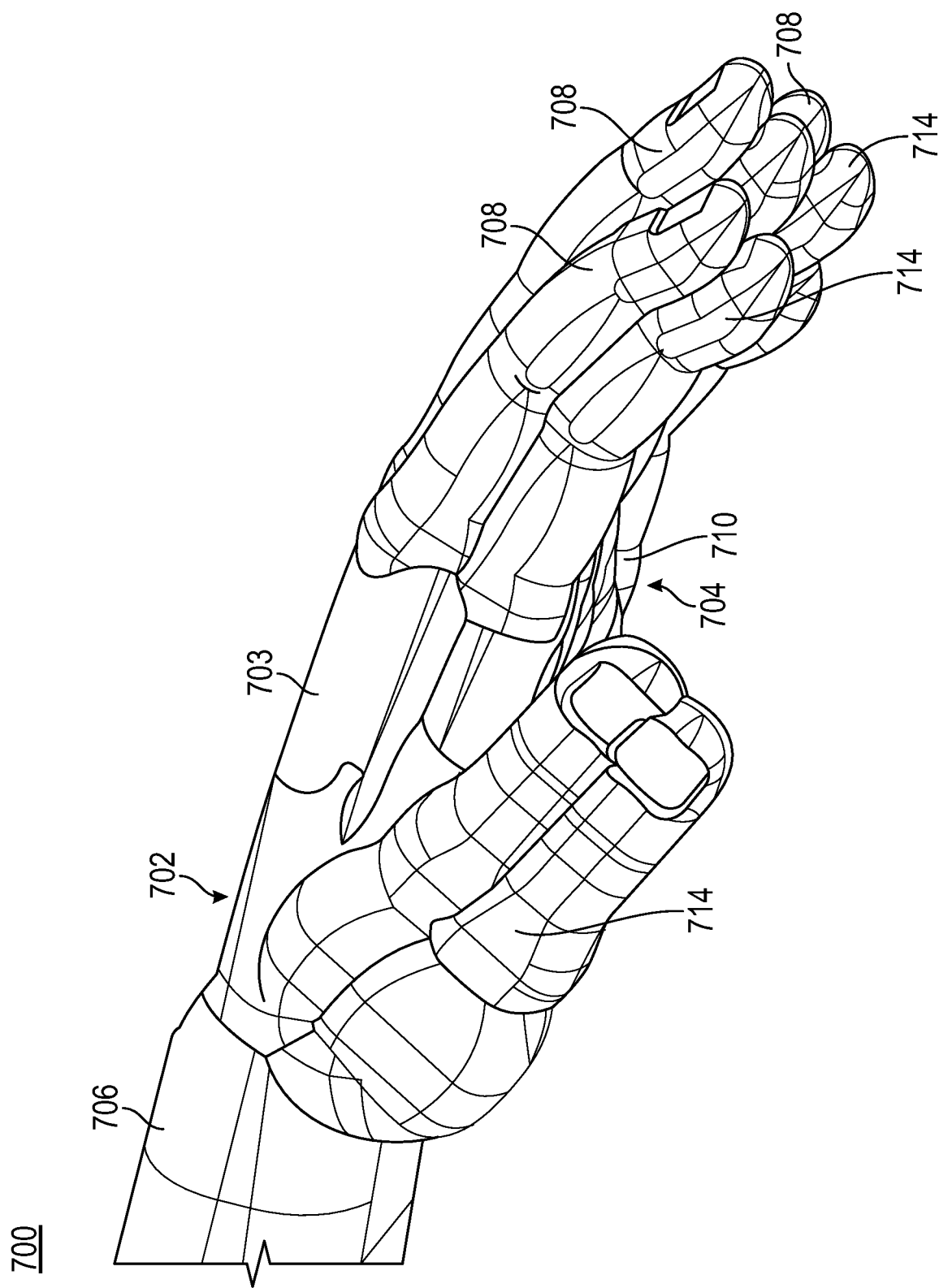
FIGS. 7A and 7B illustrate various views of a hand-over-hand apparatus, in accordance with an embodiment of the present disclosure.
Figure 7B:
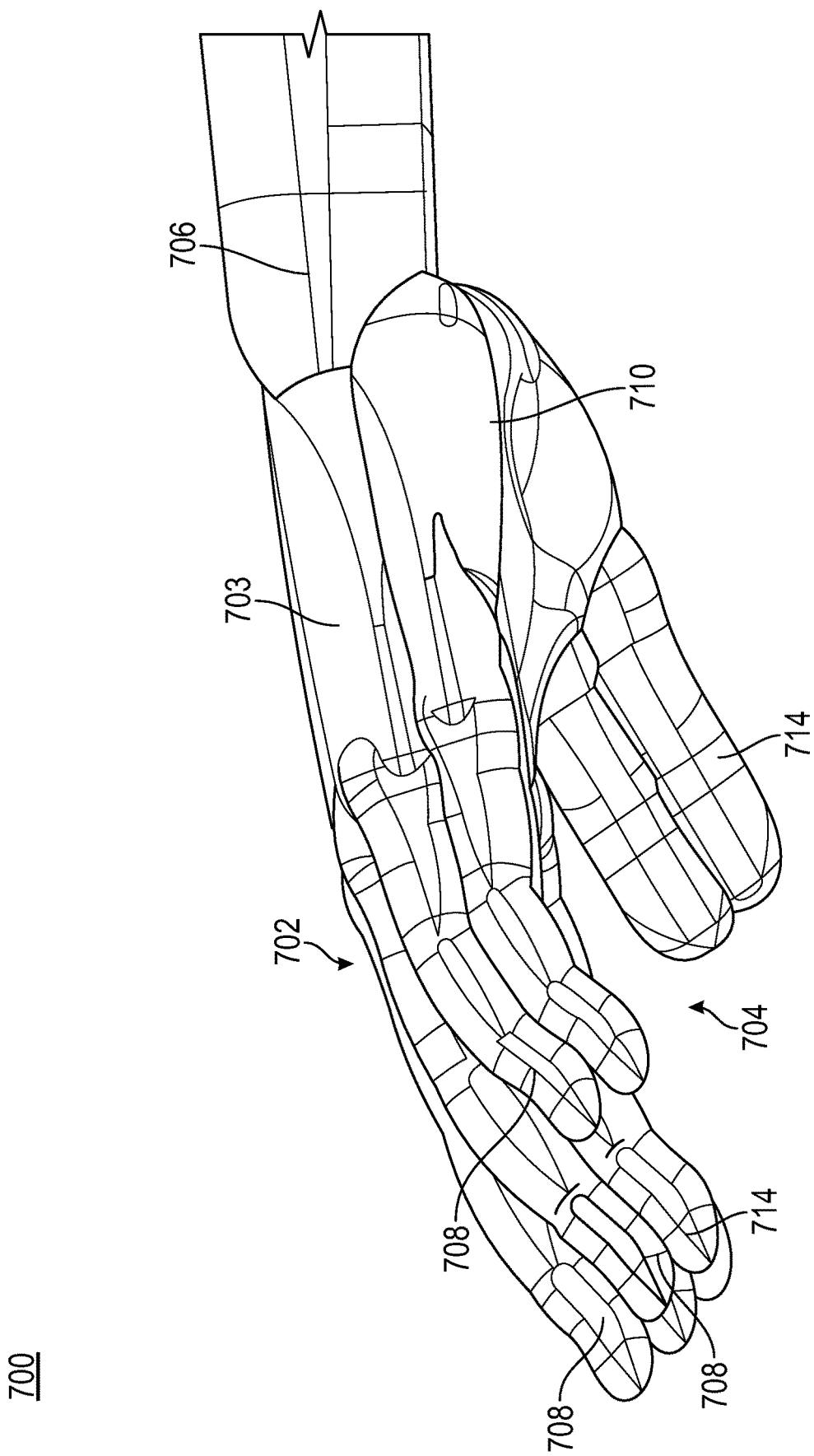

FIGS. 7A and 7B illustrate various views of an apparatus 700, in accordance with an aspect of the present disclosure. The apparatus 700 may be similar to the apparatus 600. The apparatus 700 includes a first glove 702 and a second glove 704. The first glove 702 includes a body 703, a wrist portion 706, and five finger elements 708. The second glove 704 includes a body 710, and five finger elements 714. The use of the apparatus 700 may be similar to the apparatus 600. As illustrated in FIGS. 7A and 7B, during use, the first glove 702 can be moved to control movements of the second glove 704 due to attachment between the first and second gloves 702, 704. Specifically, each of the finger elements 708 of the first glove 702 is attached to a corresponding element 714 of the second glove 704. Therefore, the apparatus 700 allows a first user wearing the first glove 702 to control individual movements of the fingers of a second user wearing the second glove 704. Further, the body 703 of the first glove 702 may be also attached to the body 710 of the second glove 704, thereby allowing the first user to control the movements and apply pressure on the hand of the second user.

Figure 8:
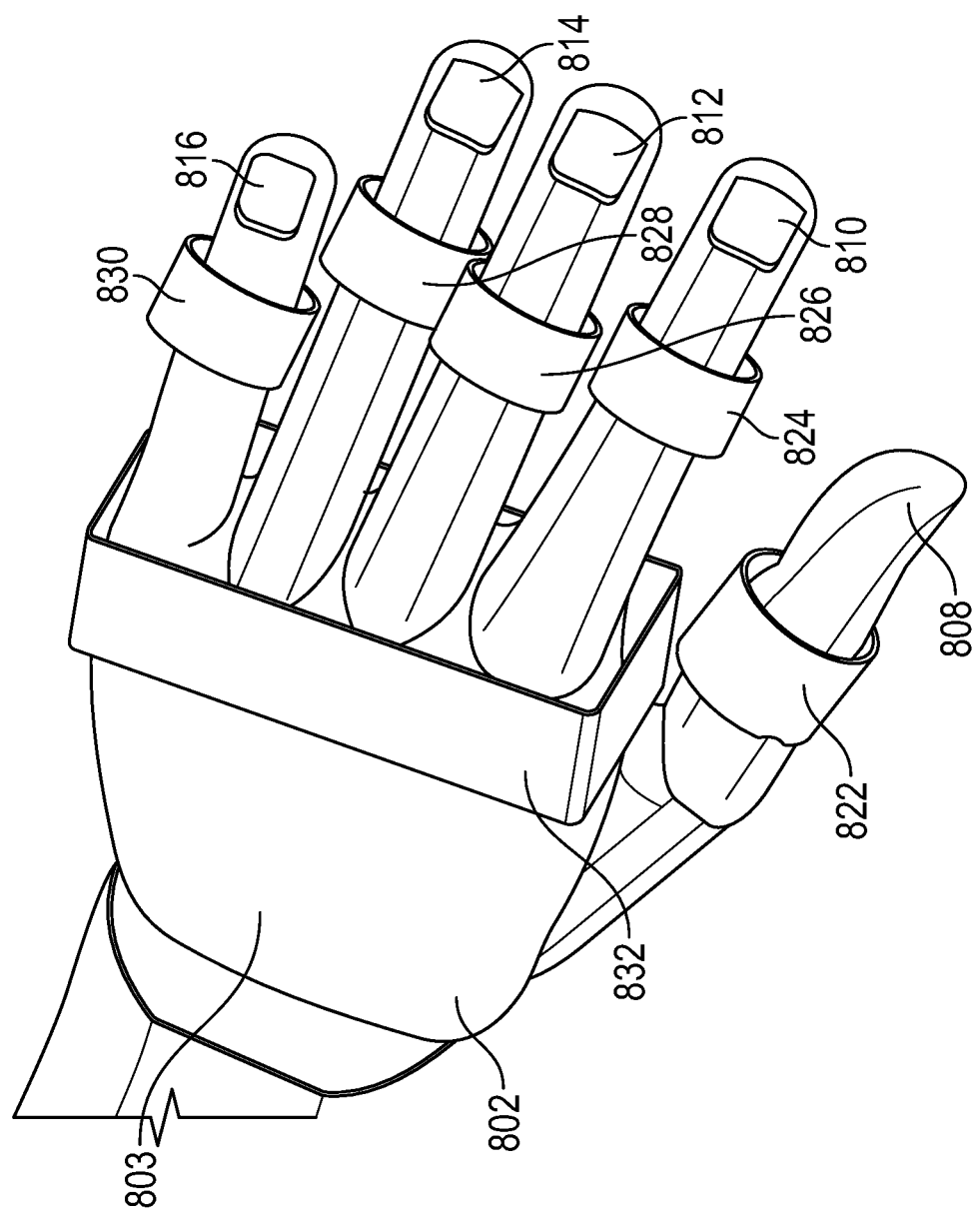
FIG. 8 illustrates a top perspective view of a hand-over-hand device, in accordance with an embodiment of the present disclosure.

FIG. 8 illustrates a top perspective view of a hand-over-hand device 800, in accordance with an embodiment of the present disclosure. The apparatus 800 may be similar to the apparatus 300, except for an additional material band that holds palms of the users together. The material of the material band may be an elastic material and/or a fabric material. Further, for the purposes of the present disclosure, similar parts are provided with corresponding reference numerals.

The apparatus 800 may include a glove 802 having a body 803. The body 803 may enclose a hand of the first user. The body 803 also includes five finger elements 808, 810, 812, 814 and 816. The finger elements 808, 810, 812, 814 and 816 may define enclosed volumes configured to enclose a thumb, an index finger, a middle finger, a ring finger and a little finger, respectively, of a first user.

In an exemplary embodiment, the apparatus 800 may also include six material bands 822, 824, 826, 828, 830, and 832 attached to the corresponding five finger elements 808, 810, 812, 814 816 and the body 803 of the glove 802. In an exemplary embodiment, the five material bands 822, 824, 826, 828, 830 may receive a thumb, an index finger, a middle finger, a ring finger and a little finger, respectively, of a second user, while the material band 832 may support the hand the second user. Specifically, the material band 832 may secure the palm of the second user to the palm of the first user. The material bands 822, 824, 826, 828, 830, and 832 may be configured to secure the hand of the second user under the hand of the first user. Alternatively, the material bands 822, 824, 826, 828, 830, and 832 may also be configured to secure the hand of the second user on top of the hand of the first user.

The apparatus 800 may include six material bands 822, 824, 826, 828, 830, and 832 configured to secure all the fingers and the hand of the second user under the hand of the first user to allow greater control and provide maximum pressure. On the other hand, the apparatus 300 includes five material bands 322, 324, 326, 328, and 330 configured to secure only the fingers of the second user to the fingers of the first user. Therefore, the apparatus 300 provides maximum movement and flexibility to each of the first user and the second user.

The apparatus 100, as described above, can be used to perform various operations, such as, but not limited to, learning and training of disabled or autistic children. Such operations can also be performed by any of the apparatus 200, 300, 400, 500, 600, 700, or 800.

Exemplary methods of using the apparatus 100, as an educational and learning tool through tactile sensory demonstration and action, are described below. Such exemplary methods may be communicated to guides/teachers/parents in the form of detailed instructions to facilitate training of students/children with developmental disabilities.

For these operations, the guide or the adult will need to stand behind the student or child (collectively "student"), while using the apparatus with the student. Tasks are to be practiced with the student consistently over time. In an example, the first part 102 of the apparatus 100 is worn by the guide, while the second part 104 is worn by the student.

All tasks are described in beginning, middle and end phases. These phases may be just a template for the guide to use. The phases do not have any particular length of time and are not necessarily mutually exclusive of one another. The guide must be mindful in assessing the needs of the student, i.e., whether the guide needs to: slow down in his/her approach, apply more or less physical strength, when and when not to use verbal prompts, when to fade out verbal prompts, and when to test the student.

The guide must understand and keep in mind that the apparatus 100 is only a learning tool, and that the guide himself must aid in the learning experience. The guide must learn to challenge the student without overwhelming the student. The guide should use positive reinforcement throughout the learning experience. Some students respond well to verbal praise. Others may need more, such as a reward after a specific number of attempts (e.g., a treat, sing a song, watch a video, etc.).

Results of the teaching and education method are contingent upon a frequency and consistency of use/practice of the apparatus 100. As in any other type of learning or therapy, the more it is applied, the greater the possibilities of learning, and at a faster rate.

The length of a session should be specific to the student's capabilities. If a session proves to be too long or overwhelming for the student, then the student may become disinterested and/or disengaged. The guide must be mindful of the student's mental status at all times. It may be optimal to begin with just a few minutes and add to session time, as the learning progresses. If time allows, the guide may attempt multiple times during a given day, at different times of the day. A recommended use is every day, during the beginning of a task. If this is not possible, then the recommended minimum usage is every other day.

As described above, all tasks are divided into the beginning, middle and end phases. During the beginning phase, the task is introduced.

During the beginning phase of these operations, it is paramount that the guide:

1. Use his/her own strength to perform task.
2. Exaggerate the motion, i.e., moving as slowly as possible, so that the student can feel the strength being applied and understand the focus needed.
3. Use verbal declaratives, such as: "wow, this is really hard to open", "let's do this". Such language may take the pressure off of the student to perform (no judgment) and enable the student to share the experience with the guide. It is important to not judge the student during the learning experience, so that the student's learning is not contingent upon student wanting to please the guide. Verbal prompts, should be used as needed and only one at a time, so as not to overwhelm the student. It is important not to use verbal prompts in excess, as they can also distract or confuse the student.

The middle phase involves an increase in the student's motivation to act.

During the middle phase:

1. The guide begins to decrease his/her own strength in the task and allows the student to begin to apply his/her own strength.
2. As the student gains strength in the task, the guide reduces use of verbal prompts.

After the first few trials (beginning phase), the guide may begin to lessen his/her strength (middle phase) used in the task, allowing the student to become engaged in the task. For example, if required, while hands are on a jar, the guide can just wait until the student makes an effort to twist the lid. The guide should allow the student to try as much as he/she can, before the guide joins in to help. The guide applies as much strength as needed, but less and less as time goes on, thereby allowing the student to take on more responsibility for the task.

If the student is slow to move, the guide needs to be patient and allow the student all the time he/she needs. The guide may add some declarative prompts, such as: "let's open this", "help me open the jar". However, if the guide chooses to use verbal prompts, it is important to state it only once and wait for the student to respond.

If the student is not motivated to engage in the task, then a reinforcement may be added. The reinforcement may be something that the student or child enjoys. For example, the reinforcement can be a small treat to eat, or a quick online video. The guide can state: "after we open this jar, you can watch a video" or "eat a treat".

After several days of trials (depending on the student's ability to master the task), the guide can begin to increase the variety and number of jars/bottles/tubes (whatever is being worked on). This may help the student to generalize the task quicker (versus learning only on one jar at a time).

As the student gains the strength needed and the ability to open jars, bottles, containers, etc., the guide relinquishes his/her own strength, allowing the student to do all the work. Once the guide believes that the student is relying on his/her own strength, it is then an opportune time for the guide to present the jars/bottles, etc. to the student without the use of the apparatus 100, i.e., testing mastery of the task.

The end phase may involve testing the student's mastery of the task.

The end phase includes:

1. At this point, the guide believes that the student is using his/her own strength to complete task, and guide is using none.

2. The guide can begin to test the student without the apparatus 100.

If the student is able to perform the task several times, without the aid of the apparatus 100, then he/she has mastered the task.

The guide is to provide verbal praise, and perhaps a reward, if the guide believes it is deserved. Some students may require more praise than others; this would depend on the guide's assessment of the student. At this point, it may be no longer necessary to practice this task continually. However, the guide may continue to present it intermittently without the apparatus 100, to ensure that the mastery is maintained over time.

The apparatus 100 can also be used for teaching tasks related to hygiene. Tasks related to hygiene may include putting on deodorant, brushing teeth, washing hands, brushing hair, washing hair/shower and blow-drying hair. With the exception of washing hair, these tasks should be performed in front of a mirror to aid learning.

During the beginning phase, the task is introduced. The object (e.g., deodorant, shampoo, etc.) in held in the student's non-dominant hand, and the student's dominant hand is used to twist off, pull off, or push off a lid/cap. The guide may use his/her own strength at first and move slowly. The guide can use declarative statements such as: 'this cap is hard to twist off'. The guide can also use vocal sounds instead of words, such as a grunt, to convey difficulty of twisting off a cap. In another example, the toothbrush is held in the dominant hand, while the toothpaste is squeezed with the non-dominant hand. Similarly, the comb/hairbrush/blow-dryer is held in the dominant hand.

The guide can quantify how much deodorant, toothpaste, etc. is used, by counting '1,2,3' or whatever the guide thinks may serve such purpose. The guide may use his/her own strength, moving very slowly and if needed, exaggeratingly slow, to rub/spray deodorant, and then switch the deodorant to other hand and repeat. The guide can use declarative statements such as: 'putting on deodorant to smell nicely', 'we need deodorant because we sweat', 'shampoo makes our hair clean', 'clean teeth are happy teeth', 'let's squeeze out the toothpaste', etc. The guide can even sing a song, 'this is the way we brush our teeth, brush our teeth, brush our teeth', etc.

During the middle phase, there may be an increase in the student's motivation to act. The beginning phase may blend into the middle phase with the exception that during the middle phase, the guide is consciously decreasing his own strength in the task, and allowing for the student to take over.

With deodorant in the dominant hand, the guide may just wait for student to raise it to his/her armpit. If the student does not yet move, then the guide can apply a little pressure, as a prompt for the student to raise the deodorant to his/her armpit. Once at the armpit, the student may be allowed to use his/her own strength in applying the deodorant. If student does not move his hand, then the guide may aid by just moving it a little bit, serving as a prompt for the student to continue. The guide can then prompt '1,2,3', counting as slowly as needed. After the deodorant is applied, it is important that the student completes the task by placing the cap back on the deodorant container. A declarative statement, such as "the cap needs to go back on the deodorant", may be used. If the student does not do so on his own, then the guide can place hand on the cap and just wait for the student to pick it up and complete task. Reinforcements may be used if required.

During the end phase, the student's mastery of the task is tested. At this point, the guide believes that the student is using own strength to complete the task. The apparatus 100 may be removed and the task is presented to the student. If the student does not respond independently after some time, then the guide can add some verbal prompts, i.e., "hmmm, how do we get the toothpaste out?". It is paramount that the guide does not have any expectations, but maintain a state of neutrality, by being patient and giving the student time to act. If the student can perform the task independently (without the tool or the apparatus 100), then he/she has mastered the task. The guide should continue to present the task (without the tool or the apparatus 100) during sessions and intermittently, as time goes on. If the student begins the task (without the tool or the apparatus 100), but then stops, the guide can then place his/her hand over the student's hand and just wait for a response.

The results may be contingent upon a frequency and consistency of use/practice. As in any other type of learning or therapy, the more it is applied, the greater the possibilities of learning, and at a faster rate.

The length of a session should be specific to the student's capabilities. If a session proves to be too long or overwhelming for the student, then the student may become disinterested and/or disengaged. The guide must be mindful of the student's mental status at all times. It may be appropriate to begin with just a few minutes and add to a session time, as time progresses. If time allows, the guide may also attempt multiple times during a given day, at different times of the day. A recommended use is every day, during the beginning of a task. If that is not possible, then the recommended minimum use is every alternative day.

The apparatus 100 can also be used for teaching tasks related to eating. The tasks related to eating include the ability to hold a fork or spoon and feed oneself, cutting food with a knife and fork, and pouring a drink and so forth.

During the beginning phase, the task is introduced to the student by using the apparatus 100. In an example, the spoon/fork is held in the student's dominant hand for spooning/piercing food. The guide may use his/her own strength at first and moves slowly taking food and bringing it to the student's mouth. The guide can use declarative statements, such as "Mmm . . . this cereal/pasta/eggs tastes good", or "Let's see how this pasta tastes", etc. It is suggested to use food that the student likes, so as to motivate student.

For the task of cutting a piece of meat or vegetable, the fork is held in the student's non-dominant hand and the knife is held in the dominant hand. Declarative statements can include "wow, this carrot is hard to cut", "let's cut this chicken so you can eat it", "we need to be very careful with the knife and cut very slowly", etc.

For the task of pouring a drink, a container that is not too heavy with liquid (e.g., milk/juice/water) may be used. However, the container may be heavy enough so that it provides a challenge for the student. Further, plastic cups/mugs may be used during the beginning phase.

During the middle phase, the guide may begin to relinquish strength, while allowing the student to apply his/her own strength in task. Declarative language, such as "I need help cutting this potato/pouring this milk", etc. may be used. The guide may wait for the student to act. If the student does not move, then the guide can give a gentle tug to guide the student. It may be important that the guide is continually assessing the student's ability in completing the task. Reinforcements may be used whenever required.

During the end phase, the guide may believe that the student is using his/her own strength to complete the task. The apparatus 100 may be removed and the task may be presented to the student. If the student does not respond independently after some time, then the guide can add some verbal prompts, i.e., "Let's cut this cucumber", "Time to pour some juice", etc. It is paramount for the guide to not have any expectations, but maintain a state of neutrality. It is also important for the guide to be patient and give the student time to act.

If the student can perform the task independently (without the tool or the apparatus 100), then he/she has mastered the task. The guide may continue to present the task (without the tool or the apparatus 100) during sessions and intermittently, as time goes on.

If the student begins the task (without the tool or the apparatus 100), but then stops, the guide can then place his hand over student's hand and just wait for a response.

Results may be contingent upon a frequency and consistency of use/practice. As in any other types of learning or therapy, the more it is applied, the greater the possibilities of learning, and at a faster rate.

The apparatus 100 can also be used for teaching tasks related fastening clothes. The tasks related to fastening clothes may include self-dressing activities, such as fastening buttons, snaps, zippers and tying shoes and so forth.

During the beginning phase, the task is introduced to the student. It is suggested to begin teaching this task through the use of oversized buttons, zippers, snaps and shoe laces, as can be found on dolls or in therapeutic tools/toys. The guide may use his/her own strength at first and move slowly. As the student masters each of these, then the size of buttons and snaps can be reduced over time. Declarative language, such as "let's get this buttoned", "this is how we tie a shoe", "this snap is tricky", etc., may also be used.

During the middle phase, the student's motivation to act is increased. The guide may begin to relinquish strength, while allowing the student to apply his/her own strength in task. The guide may wait for the student to act. If the student does not move, then the guide can give a gentle tug to guide the student. It is important that the guide continually assesses the student's ability in task, and therefore use declarative language accordingly.

For tying shoelaces, it is suggested to practice on shoes while they are not being worn. The guide may start the task as one would typically tie shoes, and place the shoes in front of the student, with the heel of each shoe closest to the student. The student may use the dominant hand in tying, while holding the first looped lace in place with the non-dominant hand.

For buttoning, the size of the button should become smaller and smaller, until the student is able to button clothing (e.g., a shirt, trousers, etc.). The student may use the dominant hand to push button through button hole. Reinforcements may be used whenever required.

During the end phase, the guide believes that the student is using his/her own strength to complete the task. The apparatus 100 is removed and the task is presented to the student. If the student does not respond independently after some time, then the guide can add some verbal prompts, i.e., "Let's tie these shoes", "This button has to go through this slit", etc. It is paramount that the guide does not have any expectations, but maintain a state of neutrality, by being patient and giving student time to act.

If student can perform the task independently (without the apparatus 100), then he/she has mastered the task. The guide may continue to present the task (without the apparatus 100) during sessions and intermittently, as time goes on. If the student begins the task (without the apparatus 100), but then stops, the guide can then place his hand over the student's hand and just wait for a response.

Results may be contingent upon frequency and consistency of use/practice. As in any other type of learning or therapy, the more it is applied, the greater the possibilities of learning, and at a faster rate.

The apparatus 100, 200, 300, 400, 500, 600, 700, or 800 can be a teaching or training tool for a classroom, a therapist's clinic or a home. The apparatus 100, 200, 300, 400, 500, 600, 700, or 800 can be used by parents of learning disabled and autistic children, special needs educators and institutions, and/or occupational therapists and institutions.

Figure 9A:
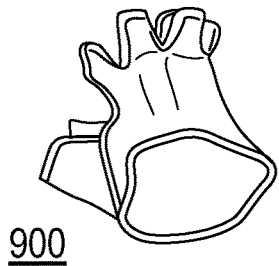
FIGS. 9A, 9B, 9C, 9D, 9E and 9F illustrate various views of an apparatus suitable for use by a younger or smaller patient.
Figure 9B:
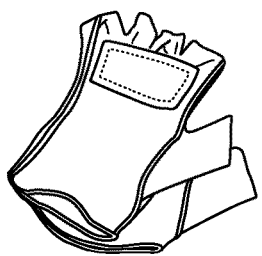
Figure 9C:
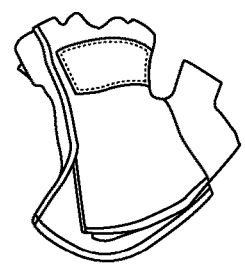
Figure 9D:
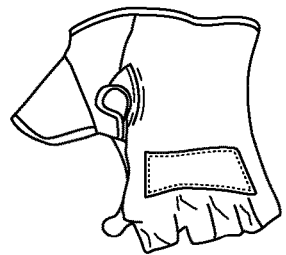
Figure 9E:
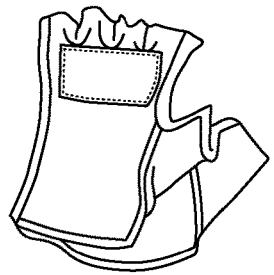
Figure 9F:
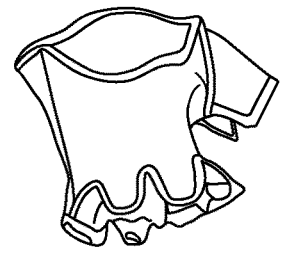

FIGS. 9A-9F illustrate various views of an apparatus 900 suitable for use by a younger or smaller patient, e.g., one who is within an age range of about 3-9 years old. FIG. 9A is top part view, FIG. 9B is a bottom part view, and FIG. 9C is a side view depicting an attachment of apparatus 900. FIG. 9D is a bottom part view of fingers, band, and attachment on a thumb side. FIG. 9E illustrates details of the outside seams, and FIG. 9F shows a top part view of the fingers portion of apparatus 900. Apparatus 900 may further include a band on the child side, either as a replacement for or in addition to a child-sized glove. The band would run transversely across a child's palm when the child's hand is inserted into apparatus 900.

Figure 9G:
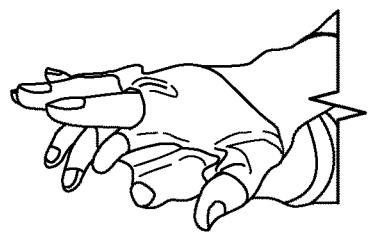
FIGS. 9G, 9H and 9I illustrate usage of the apparatus illustrated in FIGS. 9A through 9F.
Figure 9H:
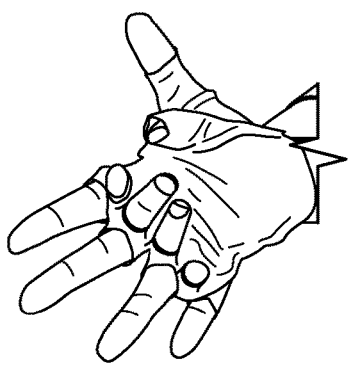
Figure 9I:
Figure 10A:
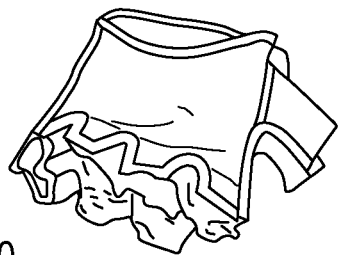
FIGS. 10A, 10B, 10C, 10D, 10E and 10F illustrate various views of an apparatus suitable for use by a relatively larger patient.
Figure 10B:
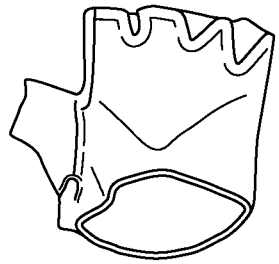
Figure 10C:
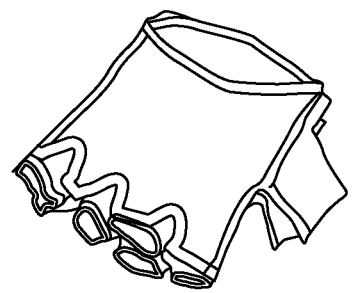
Figure 10D:
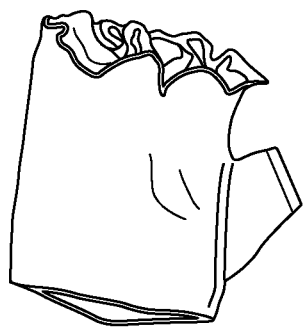
Figure 10E:
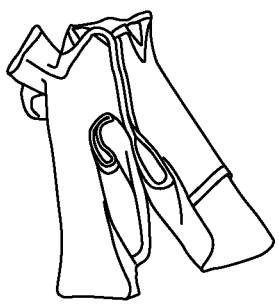
Figure 10F:
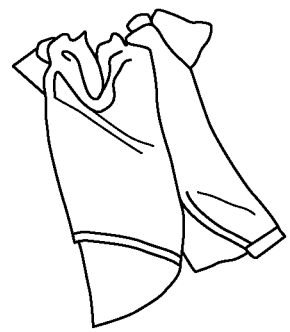
Figure 10G:
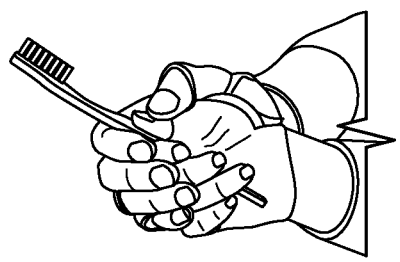
FIG. 10G illustrates usage of the apparatus illustrated in FIGS. 10A through 10F.

FIGS. 9G-9I illustrate various views of usage of apparatus 900. Apparatus 900 may be used in at least two ways, e.g., utilizing the band for a toddler, or utilizing the bottom part for a child with a bigger hand. FIG. 9G is a top view, and FIG. 9H is a bottom view, of apparatus 900 during usage. FIG. 9I illustrates a typical usage scenario of apparatus 900. Apparatus 900 differs from apparatus 100 at least by having shaped the adult side (also referred to as a parent side, guide side, teacher side, etc.) being shaped to facilitate entry and exit of hands from apparatus 900.

Furthermore, apparatus 900 differs from apparatus 800 by having deleted the elastic bands from the fingers, and the palm elastic 832 is modified into a wider band on the child side of apparatus 900. The wider band may accommodate a hand of a toddler or small child to slip into apparatus 900 with ease. The adult (or parent, guide, teacher, etc.) can still have control, while the child can still feel movement and amount of pressure from above during demonstration and action.

In particular, apparatus 900 may include two gloves or apparatuses sized accordingly, one glove for an adult and the other glove for a child, connected for hand-over-hand tactile and sensory demonstration and action. The gloves may be attached at their sides in order to provide improved control and feel (e.g., tactile feedback) during activity demonstration and action. Apparatus 900 may include minimal attachment in order to allow greater movement and flexibility while maintaining control. Apparatus 900 may be free (i.e., not coupled together) at the wrists in order to allow greater range of motion. Apparatus 900 may be fingerless in order to allow for improved feel (e.g., tactile feedback) and to strengthen dexterity.

Apparatus 900 may have an adult side that is shaped for easy entry and exit but still having enough coverage (e.g., covering the knuckles and halfway down back of hand) for control and feel during activity demonstration and action. The shape allows for greater ease for an adult when putting on apparatus 900, as well as an ability to quickly disengage the adult hand from apparatus 900 if necessary.

Apparatus 900 may include a child side sized for smaller hands of younger ages (approximate ages 3 to 9 depending upon child), with an additional feature of an attached band at the near top (palm side) in order to allow smaller hands, including toddler-size hands. A smaller and/or toddler size hand would simply slide into the band, and the adult would control motion and demonstration from their part of apparatus 900 while observing from above the child.

Apparatus 900 may be sewn, heat-sealed, fastened with hook and loop fasteners like Velcro®, or attached with clips, pins, snaps, and so forth (generically, "attachment features"), in order to hold together the top part to the bottom part. Apparatus 900 may include an additional feature of an attached band at the near top (palm side) to allow smaller and/or toddler size hand. The band may be secured in place by an attachment feature as previously discussed.

Apparatus 900 may be constructed from a stretchable fabric, a compression or compressible fabric, and a material with additional properties such as being quick dry, stain-resistant and easily washable, and so forth. Compared to apparatus 100, apparatus 900 may provide an adult side that is shaped to facilitate entry and exit.

Apparatus 900 improves upon apparatus 800 by deleting the material bands from the fingers, and having palm material band 832 be modified into a wider band on the child side of the apparatus. The wider band is to accommodate the hand of a toddler or small child slipping in with ease, and whereby the Adult, Parent, Guide and or Teacher can still have control, and the child/toddler can still feel movement and amount of pressure from above during demonstration and action.

Apparatus 900 may include a further improvement of having all seams located on an outside surface of at least the bottom part in order to provide a smooth, seamless finish and tactile sensation in the interior of the apparatus to accommodate sensitivity and sensory aversion. In some embodiments, both the top part and bottom part may have seams located on outer surfaces of the respective parts. Such embodiments may have no seams on inner surfaces, i.e., no seams on surfaces facing an inner cavity of the part which would be in direct contact with a hand during normal usage. Apparatus 900 may further accommodate toddlers and small-hand children beyond the use of the attached band, because as a child grows and their hands get larger, the child may use the glove part and continue learning utilizing apparatus 900.

FIG. 10 illustrates an apparatus 1000 suitable for use by an older child, grown adult patient, or other patient with a relatively large hand, e.g., one who is at least 10 years old. FIG. 10A illustrates a top part view, usable by an adult. FIG. 10B illustrates a top part view of a fingers portion and the outside seam detail. FIG. 10C illustrates a top part view of an adult side of apparatus 1000. FIG. 10D illustrates a bottom part view of a child side of apparatus 1000. FIG. 10E illustrates a side view depicting an attachment at a thumb and index finger location. FIG. 10F illustrates a side view depicting an attachment at a fourth (i.e., little finger) side. FIG. 10G illustrates a usage application, specifically learning to brush teeth.

Apparatus 1000 differs from apparatus 100 at least by having the adult side (or parent, guide, teacher side, etc.) of apparatus 1000 being shaped to facilitate entry and exit of the adult hand.

Apparatus 1000 top and bottom portions may be attached at their sides in order to provide improved for control and tactile feel and feedback during an activity demonstration and action.

Apparatus 1000 minimizes attachments in order to allow greater movement and flexibility while maintaining control. For example, apparatus 1000 may be free at the wrists in order to allow greater range of motion, and apparatus 1000 may be fingerless in order to allow improved feel and strengthen dexterity.

Although the adult side of apparatus 1000 may be shaped to provide easier entry and exit, apparatus 1000 still has enough coverage (e.g., at least covering the knuckles and half-way down the back of the hand) to provide improved control and feel during an activity demonstration and action. This feature allows greater ease for the adult when putting on the apparatus 1000, as well providing an ability to quickly disengage if necessary.

Apparatus 1000 may include a child side that is sized for larger hands of older children, teenagers, or another adult-sized person (e.g., older than about 10 years old).

Apparatus 1000 may have all seams be located on an outside (exterior) surface of both the top part and the bottom part in order to provide a smooth, seamless finish in the interior of the apparatus to accommodate sensitivity and sensory aversion of hands within apparatus 1000.

Apparatus 1000 may be constructed from a technical fabric. A technical fabric is known as a material that provides a particular function and/or benefit (e.g., a neoprene, an elastane such as Lycra® or Spandex®, a softshell jersey, etc.). A technical fabric may be used with apparatus 1000 to provide desired levels of stretch, compression, and additional properties such as quick dry, stain-resistant and easy washability and so forth.

Figure 11:
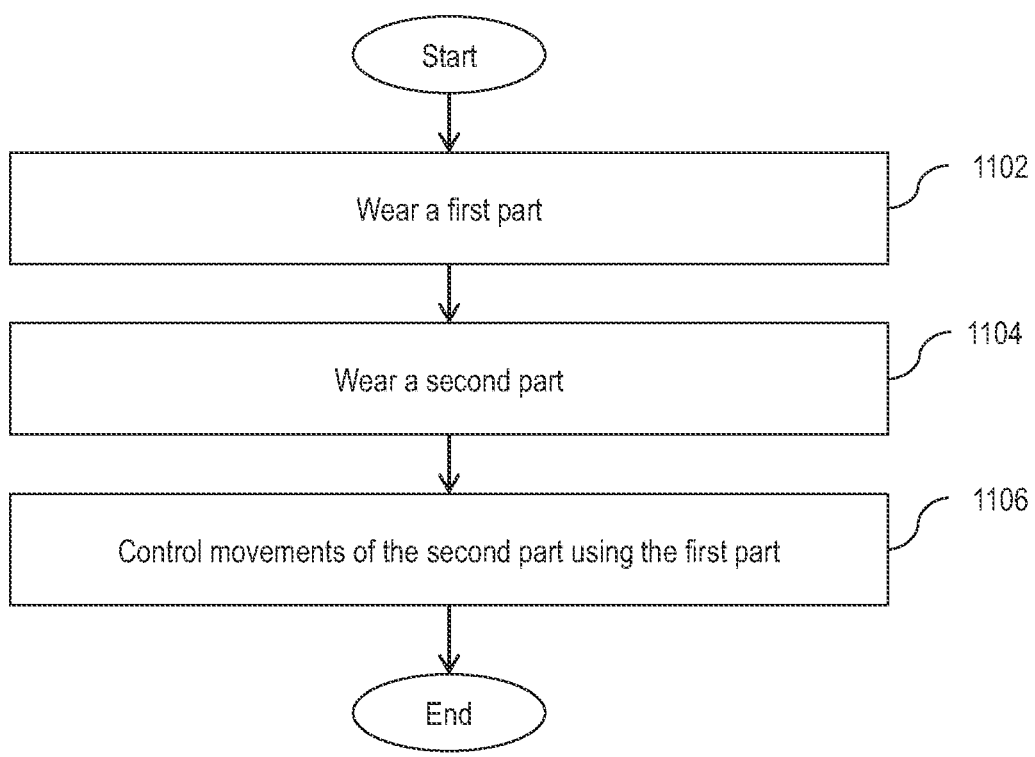
FIG. 11 illustrates a flowchart of a method of teaching a task using a hand-over-hand apparatus, in accordance with an embodiment of the present disclosure.

FIG. 11 illustrates a method 1100 of using embodiments of the invention for training or educating a student through tactile sensory demonstration and action. The method 1100 may be implemented using any of the apparatus 100, 200, 300, 400, 500, 600, 700, 800, 900, or 1000. For descriptive purposes, the method 1100 will be described with reference to the apparatus 100 (shown in FIGS. 1A-1C).

At step 1102, the first part 102 of the apparatus 100 is worn by a guide. Specifically, the guide may insert his/her hand through the wrist opening 106a so that the hand is enclosed by the body 103 and the fingers are partially received within the corresponding finger elements 108, 110, 112, 114 and 116. In an embodiment, the guide may wear the first part 102 on each of the hands.

At step 1104, the second part 104 of the apparatus 100 is worn by a student. Specifically, one hand of the student may be inserted through the wrist opening 122a so that the hand is enclosed by the body 105 and the fingers are partially received within the corresponding finger elements 124, 126, 128, 130 and 132. In an embodiment, the student may wear the second part 104 on each of the hands.

At step 1106, the guide may control movements of the student and apply pressure, as required, using the first part 102 of the apparatus. Therefore, the first part 102, worn by the guide, is used to control the movements of the second part 104 worn by the student. In case, the apparatus 100 is worn on two hands, the guide may control both hands of the student. The controlled movements and applied pressure may depend upon a task that is being taught to the student. The task may be any task, for example, but not limited to, opening a bottle, performing a hygiene related task, eating, fastening clothes/shoes, manipulating scissors, writing and so forth.

Though the apparatus 100, 200, 300, 400, 500, 600, 700, 800, 900, and 1000 as described above, include one or more gloves, the present disclosure may also include a hand-over-hand apparatus having any first part configured to be secured to a hand of a guide, and any second part configured to be secured to a hand of a student. The first part and/or the second part may not be a glove.

Further, in an embodiment, the apparatus 100, 200, 300, 400, 500, 600, 700, 800, 900, and 1000 may be made of a similar material.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the disclosure to the precise form disclosed. Modifications and variations are possible in light of the above teachings or may be acquired from practice of the disclosure. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the disclosure unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112(f), and any claim without the word "means" is not so intended.

We claim:

1. An apparatus for learning by physical demonstration, comprising:
   a first glove adapted to a human hand of a guiding instructor, the first glove comprising: a palm-side outer surface; a dorsal-side outer surface opposite from the palm-side outer surface; and one or more finger portions adapted to at least partially enclose a respective finger; and
   a second glove sized and shaped to accommodate a human hand of a student, wherein a size of the first glove is different than a size of the second glove, the second glove comprising: a palm-side outer surface; a dorsal-side outer surface opposite from the palm-side outer surface; and one or more finger portions adapted to at least partially enclose a respective finger,
   wherein the second glove is configured to removably couple in a palm-to-dorsal orientation with the first glove to permit guided movement of the human hand of the student by the human hand of the guiding instructor such that the human hand of the student mimics movements made by the human hand of the guiding instructor during performance of a manual task, and
   wherein seams of the first glove or second glove are located only on an outer surface of the first glove or second glove, respectively.

2. The apparatus of claim 1, wherein the second glove is smaller than the first glove.

3. The apparatus of claim 1, further comprising a finger attachment between a finger portion of the first glove and a finger portion of the second glove.

4. The apparatus of claim 3, wherein the finger attachment comprises a material band.

5. The apparatus of claim 4, wherein the material band comprises a material selected from a group consisting of an elastic material and a fabric material.

6. The apparatus of claim 1, wherein a finger portion of the first glove and a corresponding finger portion of the second glove are open-ended.

7. The apparatus of claim 1, wherein the second glove comprises a material selected to accommodate sensory sensitivities associated with autism spectrum disorder, the material comprising at least one of a natural fabric, synthetic fabric, wool, leather, rubber, latex, and neoprene.

8. The apparatus of claim 1, wherein the dorsal-side of the second glove is coupled to the palm-side of the first glove.

9. The apparatus of claim 1, wherein the second glove is coupled to the first glove only at one or more finger sections.

10. The apparatus of claim 1, wherein a wrist portion of the second glove remains free from a wrist portion of the first glove.

11. The apparatus of claim 1, wherein the first glove is larger in size than the second glove.

12. The apparatus of claim 11, wherein the first glove is configured to fit a right human hand or a left human hand of the guiding instructor, and wherein the second glove is configured to fit a right human hand of the student or a left human hand of the student corresponding to a directive hand of the guiding instructor, the apparatus further comprises:
   a third glove configured to fit the other of a left or right human hand of the guiding instructor, the third glove comprising:
      a palm-side outer surface;
      a dorsal-side outer surface opposite from the palm-side outer surface; and
      one or more finger portions adapted to at least partially enclose a respective finger, and a fourth glove configured to fit the other of a left or right human hand of the student, the fourth glove comprising:
  a palm-side outer surface;
  a dorsal-side outer surface opposite from the palm-side outer surface; and
  one or more finger portions adapted to at least partially enclose a respective finger.

* * * * *